(12) United States Patent
Fenney

(10) Patent No.: US 9,699,470 B2
(45) Date of Patent: Jul. 4, 2017

(54) METHOD AND APPARATUS FOR COMPRESSING AND DECOMPRESSING DATA

(71) Applicant: Imagination Technologies Limited, Kings Langley (GB)

(72) Inventor: Simon Fenney, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 15/342,002

(22) Filed: Nov. 2, 2016

(65) Prior Publication Data

US 2017/0078684 A1    Mar. 16, 2017

Related U.S. Application Data

(60) Division of application No. 14/308,778, filed on Jun. 19, 2014, now Pat. No. 9,569,860, which is a
(Continued)

(30) Foreign Application Priority Data

Dec. 20, 2011  (GB) .................................. 1122022.5

(51) Int. Cl.
*G06T 9/00* (2006.01)
*H04N 19/59* (2014.01)
(Continued)

(52) U.S. Cl.
CPC .............. *H04N 19/44* (2014.11); *G06T 9/00* (2013.01); *G06T 11/60* (2013.01); *H04N 19/176* (2014.11);
(Continued)

(58) Field of Classification Search
None
See application file for complete search history.

(56) References Cited

U.S. PATENT DOCUMENTS

| 4,729,020 A | 3/1988 | Schaphorst et al. |
| 6,912,014 B2 * | 6/2005 | Kondo ................. H04N 7/0137 348/458 |

(Continued)

FOREIGN PATENT DOCUMENTS

| GB | 2382736 A | 6/2003 |
| GB | 2417384 A | 2/2006 |

(Continued)

OTHER PUBLICATIONS

Fenney S: "Texture compression using low-frequency signal modulation", Proceedings of the SIGGRAPH/Eurographics Workshop on Graphics Hardware—GH '03—Graphics Hardware 2003, Jul. 26, 2003 (Jul. 26, 2003), pp. 84-91.

*Primary Examiner* — Michelle Entezari
(74) *Attorney, Agent, or Firm* — Vorys, Sater, Seymour and Pease LLP; Vincent M DeLuca

(57) ABSTRACT

Methods and apparatus are provided for compressing and decompressing image data by producing two sets of reduced size image data, generating a modulation value for each elementary of the area from the image data, the modulation value encoding information about how to combine the sets of reduced size image data to generate an approximation to the image. In one arrangement, a set of index values is generated corresponding to a set of modulation values for each of the respective elementary areas of a group of elementary areas and these are assigned to each respective group and a second set of index values corresponding to one of the set of first index values for each elementary areas is assigned to each first group of elementary areas. These index
(Continued)

values are stored for use in deriving modulation data more accurately when decompressing the image data.

10 Claims, 13 Drawing Sheets

Related U.S. Application Data continuation of application No. PCT/EP2012/076522, filed on Dec. 20, 2012.

(51) Int. Cl.
| | | |
|---|---|---|
| H04N 19/176 | (2014.01) | |
| H04N 19/184 | (2014.01) | |
| H04N 19/426 | (2014.01) | |
| H04N 19/44 | (2014.01) | |
| H04N 19/90 | (2014.01) | |
| G06T 11/60 | (2006.01) | |

(52) U.S. Cl.
CPC ......... *H04N 19/184* (2014.11); *H04N 19/426* (2014.11); *H04N 19/59* (2014.11); *H04N 19/90* (2014.11)

(56) References Cited

U.S. PATENT DOCUMENTS

| | | | |
|---|---|---|---|
| 6,971,012 B1 | 11/2005 | Shimizu | |
| 7,009,627 B2* | 3/2006 | Abe | G09G 3/22 345/690 |
| 7,242,811 B2 | 7/2007 | Fenney | |
| 7,697,639 B2* | 4/2010 | Kim | H04L 27/0012 375/259 |
| 7,724,819 B2* | 5/2010 | Ishikawa | H04N 21/234327 375/240.03 |
| 7,729,547 B2* | 6/2010 | Sato | H04N 1/00167 382/233 |
| 8,107,751 B2* | 1/2012 | Lei | G06K 9/38 375/242 |
| 8,453,130 B2 | 5/2013 | Benjamin | |
| 8,612,502 B2* | 12/2013 | Budianu | H04L 5/023 708/290 |
| 8,660,375 B2* | 2/2014 | Lim | H04N 19/176 375/240.03 |
| 8,873,637 B2* | 10/2014 | Isani | G06F 9/3001 375/240.2 |
| 8,995,778 B2* | 3/2015 | Yie | G06T 9/004 382/233 |
| 9,183,852 B2 | 11/2015 | Cideciyan | |
| 9,237,325 B2* | 1/2016 | Chujoh | H04N 9/646 |
| 9,277,139 B2 | 3/2016 | Herman | |
| 2004/0151372 A1 | 8/2004 | Reshetov et al. | |
| 2006/0092168 A1 | 5/2006 | Wetzel | |
| 2006/0093041 A1 | 5/2006 | Cieplinski | |
| 2008/0085058 A1 | 4/2008 | Cai | |
| 2008/0320288 A1 | 12/2008 | Yokoi | |
| 2009/0110305 A1 | 4/2009 | Fenney | |
| 2009/0319855 A1 | 12/2009 | Yue | |
| 2011/0047171 A1 | 2/2011 | Paparizos | |

FOREIGN PATENT DOCUMENTS

| | | | | |
|---|---|---|---|---|
| GB | 2423906 A | 9/2006 | | |
| GB | 2439481 A | 12/2007 | | |
| GB | 2445008 A | 6/2008 | | |
| GB | 2457646 A | 8/2009 | | |
| JP | EP 0825603 A2 * | 2/1998 | ......... | G11B 20/1833 |
| WO | 2008/073455 A1 | 6/2008 | | |
| WO | 2009/056815 A | 5/2009 | | |
| WO | 2010/082886 A | 7/2010 | | |
| WO | 2012/050489 A | 4/2012 | | |

\* cited by examiner

METHOD AND APPARATUS FOR COMPRESSING AND DECOMPRESSING DATA

CROSS REFERENCE TO RELATED APPLICATIONS

This application is a continuation of PCT/EP2012/076522 filed on Dec. 20, 2012, which claims priority from GB 1122022.5, filed on Dec. 20, 2011, both entitled "METHOD AND APPARATUS FOR COMPRESSING AND DECOMPRESSING DATA", and which are incorporated by reference in their entirety for all purposes.

BACKGROUND

Field

This invention relates to a method and apparatus for compressing image data and a method and apparatus for decompressing image data. The invention is useful in computer graphics systems, and in particular, in computer graphics systems that generate displays of three dimensional images on a two dimensional display and apply texture image data to surfaces in the 3D image, using stored compressed texture data.

Related Art

In 3D computer graphics, surface detail on objects is commonly added through the use of image-based textures, as first introduced in 1975 by Ed Catmull ("Computer Display of Curved Surfaces", Proc. IEEE Comp. Graphics, Pattern Recognition and Data Structures. May 1975). For example, a 2D bitmap image of a brick wall may be applied, using texture mapping, to a set of polygons representing a 3D model of a building to give the 3D rendering of that object the appearance that it is made from bricks.

Since a complex scene may contain very many such textures, accessing this data can result in two related problems. The first is simply the cost of storing these textures in memory. Consumer 3D systems, in particular, only have a relatively small amount of memory available for the storage of textures and this can rapidly become filled, especially if 32 bit per texel—eight bits for each of the Red, Green, Blue and Alpha (translucency) components—textures are used.

The second, and often more critical problem, is that of bandwidth. During the rendering of the 3D scene, a considerable amount of texture data must be accessed. In a real-time system, this can soon become a significant performance bottleneck.

Finding solutions to these two problems has given rise to a special class of image compression techniques commonly known as texture compression. A review of some existing systems can be found in "Texture Compression using Low-Frequency Signal Modulation", (S. Fenney, Graphics Hardware 2003) or the related patent, GB2417384. Some more recent developments are documented in "iPACKMAN: High-Quality, Low-Quality Texture Compression for Mobile Phones" (Ström and Akenine-Möller, Graphics Hardware 2005) and the follow-up work, "ETC2: Texture Compression using Invalid Combinations" (Ström and Pettersson, Graphics Hardware 2007).

One system for compressing and decompressing image data that is particularly well suited to texture data is described in GB2417384, the contents of which are incorporated herein by reference. In the system of GB2417384 image data is stored in a compressed form comprising two or more low resolution images together with a modulation data set. The modulation data set describes how to combine the low resolution images to provide the decompressed image data.

The decompression process of GB2417384 will now be briefly described with reference to FIG. 1. The process is normally applied to colour data but is shown here in monochrome for reproduction reasons. The compressed data includes two low-resolution colour images, 100 and 101, and a full resolution, but low precision, scalar image 102 forming a modulation data set. The data of the low resolution images are upscaled, preferably using bilinear, biquadratic or bicubic interpolation, to produce two corresponding virtual images, 110 and 111. Note that the upscaled virtual images lack much of the detail of the final image.

Pixels, 112 and 113, from their respective virtual images, 110 and 111, and the corresponding scalar value, 120, from the full resolution, low precision scalar data, 102, are sent to a blending/selection unit, 130, which blends/selects, on a per-texel basis, the data from 112 and 113 in response to 120, to produce the decompressed data, 141 of the image, 140. The mode by which the combination is done is chosen on a region-by-region basis.

For reference purposes, the storage format for the data of the preferred embodiment of GB2417384 is given in FIG. 2. Data is organised in 64-bit blocks, 200, at the rate of one 64-bit block per 4×4 group of texels for the 4bpp embodiment, or one per group of 8×4 texels for the 2bpp embodiment. Two 'base colours', 201 and 202, correspond to the two representative colours or, equivalently, a single pixel from each of the low resolution colour images 100 and 101 of FIG. 1. Each single pixel from the low resolution colour images corresponds to an (overlapping) region of texels in the decompressed image. Each such region is approximately centred on a 4×4 (or 8×4) block of texels in the decompressed image, but is larger than 4×4 (8×4) due to the upscale function. The upscaling of the low resolution images is preferably performed using a bilinear, biquadratic or bicubic interpolation with the appropriate number of near neighbour pixels in the low resolution images. The following embodiments will assume bilinear is the primary interpolation method, as this requires at most 4 samples from each of the low resolution images to produce one upscaled A or B value, but alternative upscaling methods, using potentially more samples from the A and B images, could employed.

A single bit flag, 203, then controls how the modulation data, 204, is interpreted for the 4×4 (or 8×4) set of texels. The sets of texels that are controlled by each flag are shown in FIG. 7.

The 4bpp preferred embodiment of GB2417384 has two modulation modes per region, where each region is a 4×4 set of texels. The first mode allows each texel to select one of (a), the colour of texel from 100, (b), the colour from the texel of 101, (c), a 3:5 blend of 100 and 101, or a 5:3 blend of 100 and 101. The second mode replaces the 3:5 and 5:3 blends with a pair of 1:1 blends, one of which uses the blended alpha value, and another with the same RGB values as but with the alpha component set to 0, i.e. fully transparent.

It should be noted that FIG. 1 is merely describing the concept of the decompression process and that the upscaled virtual images, 110 and 111, are unlikely to be produced and stored in their entirety in a practical embodiment. Instead, small sections of the virtual images, preferably 2×2 pixel groups, may be produced and discarded, 'on the fly', in order to produce the requested final texels.

In GB2417384, the base colour data may be in one of two possible formats as shown in FIG. 2. Each of the colours 201, 202 may independently be either completely opaque, in which case format 210 is used, or partially or fully translucent, in which case format 211 is used. A one-bit flag 212 that is present in both colours 201 and 202 determines the choice of format for each representative colour. If this bit is '1', then the opaque mode is chosen, in which case the red 213, green 214, and blue 215 channels are represented by five, five and five bits respectively for base colour B, and five, five, and four bits respectively for base colour A. Note that the reduction in bits for base colour A is simply due to reasons of space. Alternatively, if flag 212 is '0', the corresponding colour is partially transparent and the colour contains a three bit alpha channel, 216, as well a four bit Red, 217, four bit Green, 218, and a Blue field, 219, which is either four or three bits for colour 201 or 202 respectively. Since a fully opaque colour is implied by field 212, the alpha field, 216, does not need to encode a fully opaque value.

Improvements to the system described in GB2417384 are presented in our International Patent application publication number WO2009/056815. This describes how the system of GB2417384 can be improved to accommodate certain types of images, or sections of images not handled particularly well by GB2417384, such as textures which include large discontinuities at certain boundaries and those where a few quite distinct colours are used in a localised region.

This later application takes advantage of the fact that the level of flexibility offered by the scheme GB2417384 as shown in FIG. 2 is in excess of what is needed in the vast majority of situations. Therefore, the ability to have both representative colours A and B independently determined whether they are fully opaque or partially transparent has been determined not to be needed and the encoding scheme used replaced with that shown in FIG. 4. In this, data is again encoded in 64-bit units with two representative colours B 301, and A 302, a modulation mode bit, 303, and the modulation data, 304. Two additional 1 bit fields, alpha mode, 305 and hard flag, 306 are also included. To accommodate these additional fields the colour fields 301 and 302 are both reduced by 1-bit in size relative to the encoding of GB2417384.

A single opacity or alpha flag is used and is set to 1 if both the colours are fully opaque. If it is 0 then both are potentially partially transparent. Therefore, the flag that determined the opacity of base colour A now becomes a (hard transition flag) which is used to create additional modes. When colours are in the translucent mode then the stored 3-bit alpha channel for base colour B is expanded to 4-bits.

The modulation mode bit and hard transition flags combine to produce four different modes for interpreting the per pixel modulation bits available from the modulation data.

This system allows for a first improvement to the method of GB2417384 in situations where there are large colour discontinuities in the images such as long horizontal and/or vertical boundaries between texels. These can occur naturally but they are more frequent when multiple smaller textures are assembled into a single larger texture atlas for efficiency reasons as shown in FIG. 4. This texture 180 is composed of numerous smaller textures such as 181 Although such texture atlases may be assembled prior to compression, it is also useful to be able to compress the subtextures separately and then assemble the compressed pieces. This requires the ability to force the discontinuities at certain boundaries, which are assumed to lie on multiples of 4 or 8 pixels, to stop the unrelated but adjoining image data from 'interfering' when later assembled into an atlas texture.

Further improvement on GB2417384 arise in the case of texels which have more than two distinctly different colours, such as the situation shown in FIG. 3. This contains adjacent red, blue and green strips. Such extreme rates of colour change are relatively rare in natural images but can be more frequent in artist drawn images or diagrams. In practice certain colour combinations of the pairs of representative colours described in GB2417384 are not used. Each representative colour has a single bit indicating if it is fully opaque or partially transparent. This level of flexibility has been determined not to be necessary in practice and so one of the two opacity flags has been re-assigned to designate additional compression modes for regions of the texture.

One new mode for regions of Texels is used when a strong colour discontinuity is assumed to occur between certain Texels in that region. This simplifies the assembly of texture atlases, especially from pre-compressed sub-textures as well as enhancing a small number of cases in normal images.

A second new mode extends the discontinuity concept by allowing Texels in indicating regions to arbitrarily choose colours from a subset of the nearest four neighbouring pairs of representative colours. This takes the advantage of providing a larger palette of colours but avoids the use of a palette memory.

The contents of GB2417384 and WO2009/056815 are hereby incorporated by reference.

Although the additional modes introduced by WO2009/056815 improve the quality of the compressed result relative to GB2417384, there are situations where it is desirable for each pixel to be able specify its modulation value with greater precision or, say, to select from a larger palette of colours. In either case, this requires a greater number of bits to encode such data but increasing the overall storage is undesirable.

THE SUMMARY OF THE INVENTION

We have appreciated that there is frequently a correlation of the colour data within the compressed image data and that developments of our earlier compressions/decompression schemes described above can exploit this to make available more bits of modulation data and thereby improve the accuracy of the compression/decompression process. That is to say, we often get greater overall accuracy by de-correlating and/or sacrificing precision in the colour data and using the data bits released to provide additional detail in the modulation data.

We have appreciated that further formats for compressing the image (texture) data and techniques for decompressing or unpacking that texture data can provide further modes of operation. These include, 1, 2, and opaque-only 3 channel RGB textures, improved support for normal maps and approaches which can be used where channel data is not correlated such as combining a 2-bit per pixel monochrome texture and a 2-bit per pixel 3 channel texture to produce a single texture. Support is also added for 1-bit per pixel textures.

In accordance with various aspects of the invention, different formats for compressing the image data are provided and corresponding decompression techniques for each format are also provided.

The invention is defined in its various aspects in the appended claims to which reference should now be made.

BRIEF DESCRIPTION OF THE DRAWINGS

Preferred embodiments of the invention will now be described in detail with reference to the accompanying drawings in which.

DETAILED DESCRIPTION OF PREFERRED EMBODIMENTS

In the various compression and decompression embodiments described below, a 64 bit compressed data word length has been used with pixels grouped into 2×2 groups within a larger block of pixels for which the 64 bit word is a compressed representation. The inventive concepts are not limited to any specific word bit length, pixel, grouping or block size, and those skilled in the art will appreciate that the inventive concepts may be applied to different bit lengths of words, different sized groupings of pixels, and different sized blocks of pixels. Nevertheless, the examples given below give reliable and efficient compression and decompression without significant loss of data in a decompressed image.

Whilst the embodiments below have been described using a 64 bit data words comprising both colour and modulation data, those skilled in the art will appreciate that the colour and modulation data can be stored separately, and that the concept of a combined data word for colour and modulation data is not limiting in the various aspects of the invention.

Figure 5:
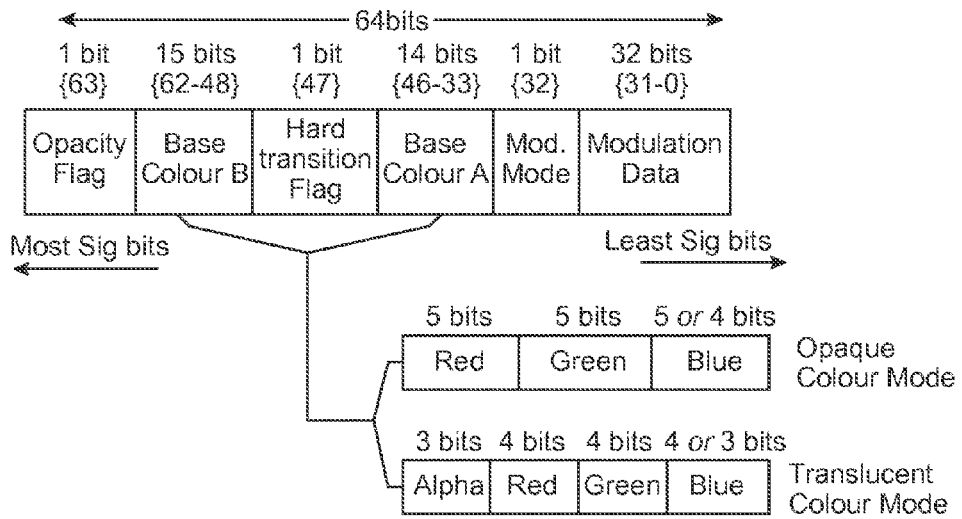
FIG. 5 illustrates the format of compressed data used in WO2009/056815.

The improved format shown in WO2009/056815 is shown in FIG. 5. In this it is shown that the base colours A and B have 14 and 15-bits respectively, i.e. they save 1-bit each on the system described in GB2417384, and only one bit is used as an alpha channel to represent the degree of translucency applied. The two bits which are saved from the colour channels are used for the hard transition flag (HF flag) and the opacity flag.

The various format extensions which have been proposed in embodiments of the present invention give additional versatility and additional modes of operation and are now described. The embodiments are described with reference to texture compression/decompression, and the fundamental image units are referred to as texels. These are equivalent to pixels when the embodiments are applied to image compression/decompression, since textures are images.

1.5 Channel Format

Figure 6:
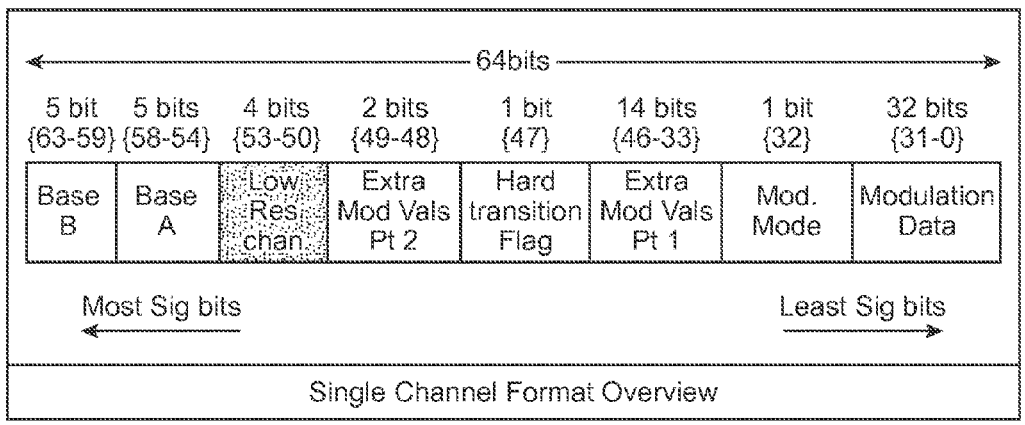
FIG. 6 shows a compressed texture format in accordance with one aspect of the present invention.

The first format extension we will consider is shown in FIG. 6. This is intended to support, primarily, a single colour channel at full resolution with a second channel at a lower resolution. This is intended to be used with grey scale data or for an alpha channel to be used in a "combined" texture format is, for example, where RGB are stored in one texture and an alpha channel for blending in a 'separate' texture. In this latter case, the two textures would subsequently be recombined during rendering in order to apply the alpha and the RGB values to the same pixels. Furthermore, these 'two' texture 'layers' may be stored explicitly as two textures, or could be referenced as a single texture, such as, say, BC2 or BC3 of DirectX. Note that there may be an advantage in separating these or other combinations of channels, in this way if there is little correlation, say, between RGB and alpha since compressing them together would provide less accuracy). There is also sometimes a need to store non colour data in texture storage. For example, data relating to shadows, specular highlights etc, for which a primarily single channel format is useful.

The fields allocated within the 64-bit word are shown in FIG. 6. For the main channel, base colours A and B are assigned 5-bits each. These are expanded to 8-bits when image data is up-scaled for decompression. A standard bit replication process can be used for this or alternatively, the combined upscale and bit expansion method expressed in GB2417384 may be employed. The additional secondary low resolution ("low-res") channel is allocated 4-bits in the data word. This is an interpolated signal. Essentially this data would be expanded in the upscaling process but would then not be subject to any modulation. Therefore, it is a low frequency signal, like the unmodulated A and B channels. It could be used as a further colour channel or as a scaling factor for the primary channels A and B to increase their dynamic ranges by providing additional bits.

Because there is a reduction in bits assigned to the base colours and a total of 14 bits are used by base colours A and B and the low-res channel, there are an additional 16 bits available which can be used to increase the precision of modulation data. These can be used in different ways.

The 1-bit modulation mode field (MOD flag) and the 1-bit hard transition flag from WO2009/056815 are still present. In addition, there are two fields of extra modulation values, part 1 comprising 14-bits, and part 2 comprising 2-bits. The separation in the described embodiment is simply for compatibility with the prior schemes, but in alternate embodiments these could in fact be re-arranged as a single field. These additional bits can then be used to increase the precision of the modulation data when combining up-scaled images from base colours A and B. These bits are used in different manners according to the mode to be applied.

1.5 Channel Four Bits Per Pixel (4BPP)

Figure 7:
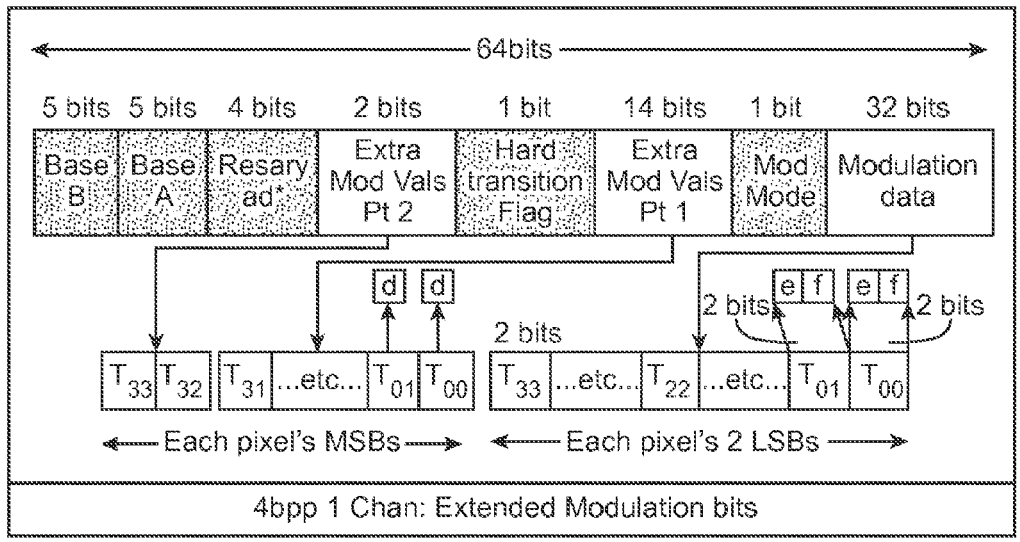
FIG. 7 shows how modulation data in FIG. 6 is applied to pixels at the rate of 3-bits per pixel.

For the 4BPP mode the additional 16 modulation bits are used to implement a direct 3-bit per texel modulation encoding. This is shown in FIG. 7.

The low resolution images, A and B, are upscaled by a factor of 4 in both the x and y dimensions and are combined, on a pixel by pixel basis, according to the per pixel modulation value and modulation mode. 32 modulation bits are available from the original proposed modulation data and with the additional 16 modulation bits available from the additional modulation fields, a total of 48 modulation bits are available for the 16 texels i.e. 3-bits per texel in total. Which bits come from which part of the modulation data is discretionary but, for example, the original 32-bits of modulation data can be used for the two least significant bits of each texel modulation data and the most significant bits can be used from the additional 16-bits of modulation data.

This data can then be used with the hard transition flag and modulation mode bit discussed above in relation to WO2009/056815 to determine how the modulation data should be interpreted.

Figure 8:
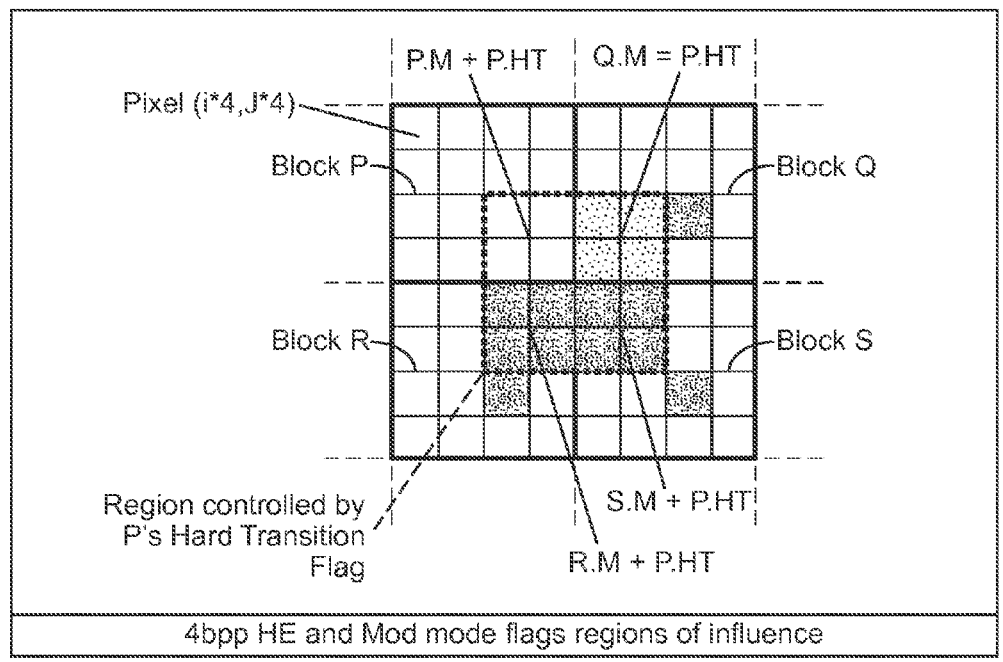
FIG. 8 shows how the modulation mode and hard transition flags of FIG. 6 are applied to different areas of a block being decompressed to control the modulation mode to be applied.

FIG. 8 shows four 4×4 blocks of texels, P, Q, R & S. Associated with the positions of these blocks are four 64-bit data words, of the type shown in FIGS. 6 and 7, which we will refer to as Pw, Qw, Rw& Sw. When bilinear upscaling is used, the centre, 4×4 region of texels (or more strictly speaking, the region of 5×5 texels that extends one further column to the right and one further row down) can be completely determined by just the data contained in Pw, Qw, Rw& Sw. Note, however, that in order to decode texels outside of that centre region, other 64-bit data words will need to be accessed, however, it is possible to arrange the bilinear upscaling so that to decode any texel, at most only 4 data words are required. Furthermore, it can be arranged so that, to decode any set of adjacent 2×2 texels, at most 4 data words are required.

Therefore, if we consider the central 4×4 region of block P thru S, the base colours A and B extracted from Pw thru Sw are upscaled to the resolution of 4×4 pixels and are combined together using the modulation data at 3-bits per pixel derived as discussed above. However, the modulation values applied to these texels are determined by the modulation modes which are selected by the hard transition flag bit and the modulation mode bit. To illustrate how the four quadrants of the central 4×4 pixel block are determined, FIG. 8 shows four 4×4 blocks P, Q, R, and S. The bottom right quadrant block P has its modulation mode selected by the mod and HT flags of data word Pw. The bottom left quadrant of block Q has its modulation modes selected by the mod flag of data word Qw and the HT flag of data word Pw. The top right quadrant of block R has its modulation mode selected by the modulation flag of data word Rw and the HT flag of Pw. The top left quadrant of block S has its modulation mode determined by the modulation flag of Sw and hard transition flag of Pw.

It can be seen, that for block P, the bottom right quadrant will have its modulation mode selected by the mod and HT flags of Pw, whilst the other three quadrants will use the modulation flag of Pw but hard transition flags from adjacent blocks/data words, these being in the case of the upper right quadrant the block above; in the case of the upper left quadrant the block diagonally left and above; and, in the case of the lower left quadrant the block to the left.

The way in which the combinations of modulation flag and hard transition flag are combined together is shown below in table 1.

TABLE 1

4 bpp 1 Chan: Interpreting HE and Mod mode flags

| Hard Transition | Modulation Flag | Texel Mode |
|---|---|---|
| 0 | 0 | 8 level Bilinear |
| 0 | 1 | Extremes + Bilinear |
| 1 | 0 | Non-Interpolated |
| 1 | 1 | Local Palette 8 |

Starting with the first line of table 1, which is 8-level bilinear modulation, the 3-bit encoding from the modulation bits supplied to each texel, allocates 8-level bilinear interpolation according to the values given below in table 2.

TABLE 2

8-level Bilinear

| Bit field value | Modulation Value |
|---|---|
| 000 | 0 {=0.0} |
| 001 | 3 {=3/8} |
| 010 | 5 {=5/8} |
| 011 | 8 {=8/8} |
| 100 | 1 {=1/8} |
| 101 | 2 {=2/8} |
| 110 | 6 {=6/8} |
| 111 | 7 {=7/8} |

As can be seen, there is one gap sequentially in that when using the allocation from table 2, the modulation value of 4/8 is not available. These modulation values are then used to combine the upscaled colours A and B in proportions dependent upon the modulation values. The ordering in this table has been chosen to maintain some compatibility with the prior schemes but one skilled in the art would appreciate that alternate orderings or different modulation values may be chosen.

In the second line of table 1, a mode of "extremes plus bilinear" is used and this is encoded as shown in table 3 below:

TABLE 3

Extremes + Bilinear

| Bit field value | Modulation Value |
|---|---|
| 000 | 0 {=0.0} |
| 001 | 4 {=4/8} |
| 010 | Force 0 × 00 |
| 011 | 8 {=8/8} |
| 100 | 2 {=2/8} |
| 101 | 6 {=6/8} |
| 110 | Force 0 × 80 |
| 111 | Force 0 × FF |

A modulation value of 4/8 is available in addition to 0, 2/8, 6/8 and 8/8. The other three possible values are labelled Force 0xXY. When the 3-bit field value indicates that one of these should be used, the output 8-bit value, rather than blending of colours A and B together, is forced to be 0x00, 0x80 or 0xFF. This is similar to the "punch through" modulation mode described in GB2417384 (FIG. 11) where it was possible to force the alpha channel output to zero. The idea of this is to find a method to encode extreme shades without having to represent them as values within the range spanned by the A and B colours. Therefore 0X00 could be equivalent to black and 0XFF equivalent to white but these often occur as erratic colours in a texture. For example, text overlaying an image would typically be in black or white but it is seldom that any other colours might require black or white. By having special codes for them, the A and B channels could be used to represent the background image and the extreme colours dropped in when required. This requires a compromise in that pure modulations are available but as the A and B channels don't have to be extended to the extremes, the levels that are available are not stretched over such a wide range. In this example this system is applied to the 1.5 channel encoding but the same principle can be applied in 2 and 3 channel modes described below.

In line three of table 1, a non-interpolated mode is used. This takes the same modulation values as are shown in table 2 for the 8 level bilinear mode but bilinear interpolation of the A and B channels is not used. Instead, the A and B colours are repeated within each of the four quadrants. Sharp colour transitions can therefore be represented at the boundaries between the blocks P, Q, R, and S (as shown in FIG. 8). The offset alignment of the effect of the modulation mode and hard transition flags makes the non-interpolated mode particularly useful at the edges of textures which have discontinuities at the borders when wrapped toroidally, as well as at discontinuities elsewhere in the image such as those that occur in texture atlases.

The fourth line of table 1 selects what is known as local palette mode. This has some similarities with the local palette mode described in WO2009/056815. However, since 3-bits per texel are available it is possible to select from a larger palette of neighbouring colours. These are shown in table 4 and further illustrated in FIG. 9.

TABLE 4

4 bpp 1 Chan: Palette Mapping

| Mod bit pattern | 'Palette' modes | | | |
|---|---|---|---|---|
| | P Blend | PQ Blend | PR Blend | PQRS |
| 000 | Uses | 0/8 Bilinear | 0/8 Bilinear | Pa |
| 001 | 'Extremes + | 3/8 Bilinear | 3/8 Bilinear | Pb |
| 010 | Bilinear' | 5/8 Bilinear | 5/8 Bilinear | Qa |
| 011 | mode | 8/8 Bilinear | 8/8 Bilinear | Qb |
| 100 | | Pa | Pa | Ra |
| 101 | | Pb | Pb | Rb |
| 110 | | Qa | Ra | Sa |
| 111 | | Qb | Rb | Sb |

Figure 9:
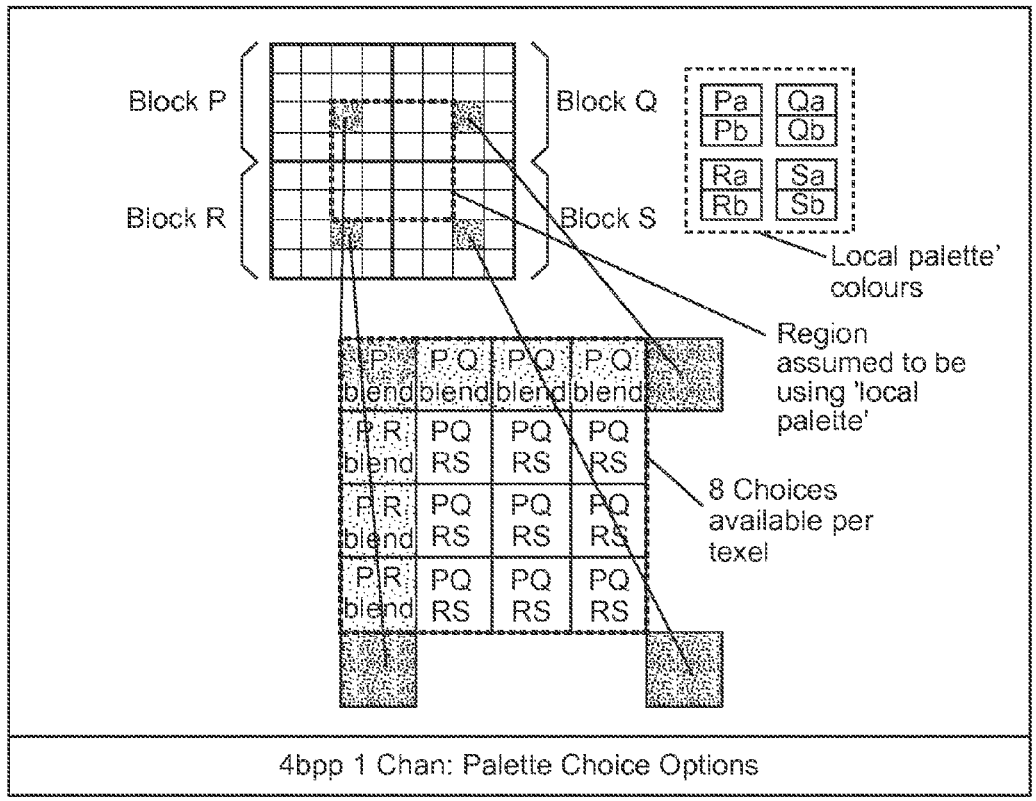
FIG. 9 shows how different palette modes of modulation are applied to different areas of a block to be decoded in a further aspect of the invention.

In this palette mode, for certain pixels the A and B up-scaled colours are available to select individually or to be combined. FIG. 9 shows for each quadrant (again illustrated as discussed with reference to FIG. 8) which palette/blend options are available to each texel when the local palette mode is selected by the mod and HT flags. There are four possible palette modes available and these are P blend, PQ blend, PR blend and PQRS. The values assigned to these for each of the 3-bit modulation values are shown in table 4. The P blend mode is the same as the "extremes plus bilinear" mode discussed above whilst the PQ blend has four bilinear modulation modes and the option of the four colours available from data words Pw and Qw (Pa, Pb, Qa and Qb).

The PR blend is similar to the PQ blend but uses colours available from data words Pw and Rw, and PQRS mode is able to select any one of the eight colours available from the four data words (Pa, Pb, Qa, Qb, Ra, Rb, Sa, Sb).

Thus, although the amount of data available for colour is significantly reduced, and therefore it is preferably applicable only to a monochrome image, by using additional modulation bits and modulation modes selected using existing HT and mod flags, a larger range of choices can be applied to up-scaled texels, thereby increasing the amount of detail in the decoded image.

1.5 Channel Two Bits Per Pixel (2 Bpp)

In WO2009/056815 we have described a directly encoded mode for texture decompression with one modulation bit for each of 32 texels and an interpolated mode with up to two modulation bits for alternative texels in the set of 32. We have appreciated that such a system can be extended, in a 1.5 channel encoding, to effectively provide a super-set of the range of values provided in WO2009/056815.

Direct Encoded Modulation Mode

When using a directly encoded mode for decompression, the additional 16-bits provided using the data format of FIG. 6 are insufficient to increase the modulation bit rate uniformly by a whole bit. With the original 32-bits of modulation data the additional 16-bits have to be distributed over 32 texels and there is therefore an additional half bit per texel. It is therefore necessary to devise a scheme whereby this data can be arranged to have substantially uniform effect on the modulation data over the whole 32 texels.

Figure 10:
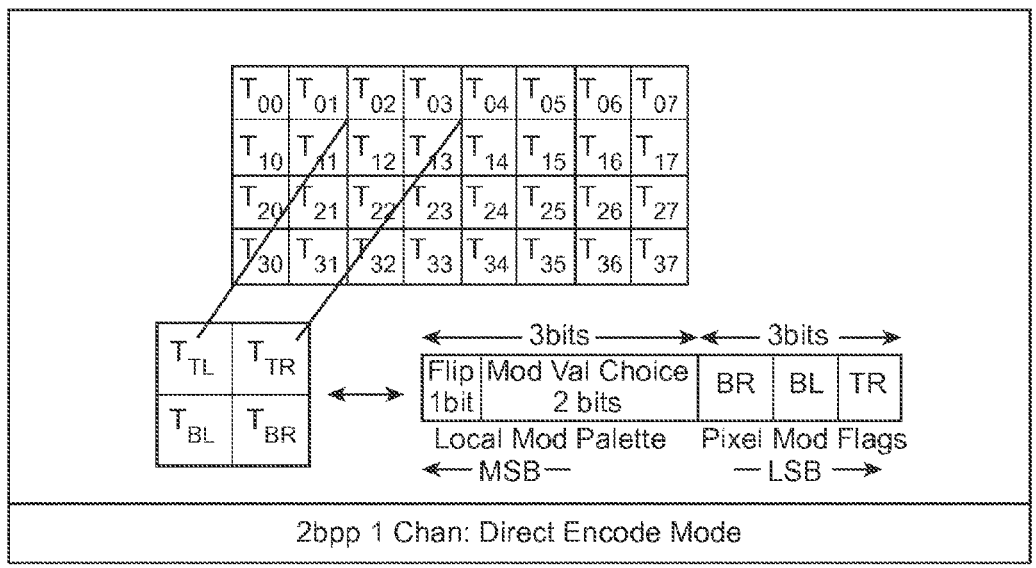
FIG. 10 shows how 48 modulation bits are applied to a block of 32 texels at the rate of 2-bits per texel.

FIG. 10 shows an expanded 8×4 block of texels which is to be decompressed using the data format of FIG. 6. The texels are arranged in sub-groups of 2×2 and one of these is shown extracted from the 8×4 block.

Four texels in the 2×2 group are identified as top left, top right, bottom left, bottom right (TL, TR, BL, BR). Six modulation bits are available for each of these. A local palette mode of operation for the four texels is shown and this uses the first three of the six bits, a flip order bit and a modulation value choice pair of bits. The modulation value choice bits will be the same for all four texels and will be one of the values shown in table 5. The flip order bit determines an additional four options for the modulation values (mod val X, mod val Y). For a flip order equal to zero there are two possible values for mod val X and two for modval Y. For flip order equal to one there are a further pair of possible values for mod val X and mod val Y.

TABLE 5

2 bpp 1 Chan: Mod Val Choice interpretation—non constant case

| Flip Order | ModVal Choice | Mod ValX | Mod ValY |
|---|---|---|---|
| 0 | 00 | 0.0 | 1.0 |
| 0 | 01 | 0.0 | 5/8 |
| 0 | 10 | 3/8 | 1.0 |
| 0 | 11 | 3/8 | 5/8 |
| 1 | 00 | 1.0 | 0.0 |
| 1 | 01 | 5/8 | 0.0 |
| 1 | 10 | 1.0 | 3/8 |
| 1 | 11 | 5/8 | 3/8 |

Mod val X and mod val Y are the two modulation values that each texel in the 2×2 block can select. The top left texel always uses mod val X and the remaining texels select either mod val X or mod val Y according to a corresponding pixel modulation flag which is assigned to respective ones of the other 3-bits of the six shown in FIG. 10 for each of the bottom right, bottom left and top right texels. For examples, a value of 0 for the respective pixel modulation flag will indicate a choice of mod val X and one will indicate a choice of mod val Y, but this could be the other way round. When these values are decompressed image quality may be improved by applying a low pass filter to obtain smoothing of the quantisation levels.

Therefore, the two modulation value choice bits and the flip order bit determine which pair of modulation values is available for mod val X and mod val Y. The position of the texel in a 2×2 block and the respective 3-bits used for pixel modulation flags then determine whether mod val X or mod val Y is used for each of the texels. Therefore, the six bits are used to determine the modulation values for each of the four texels in a 2×2 block.

If all the pixel modulation flags are 0 then all four pixels would have the same modulation value, X, applied to them To make more effective use of the encoding bits, when this occurs, as an alternative, the values used for flip order and mod val choice can be used in a manner similar to the 8-level bilinear interpolation described above with reference to table 2. This is encoded as shown in table 6, using the first 3-bits.

TABLE 6

2 bpp 1 Chan: Mod Val Choice interpretation—constant case

| 'Flip Order' | 'ModVal Choice' | Shared Modulation Value |
| --- | --- | --- |
| 0 | 00 | 0 {=0.0} |
| 0 | 01 | 3 {=3/8} |
| 0 | 10 | 5 {=5/8} |
| 0 | 11 | 8 {=8/8} |
| 1 | 00 | 1 {=1/8} |
| 1 | 01 | 2 {=2/8} |
| 1 | 10 | 6 {=6/8} |
| 1 | 11 | 7 {=7/8} |

Those skilled in the art will appreciate that other arrangements of bits could be used to encode a similar set of bits, e.g eliminating the 'flip order' flag and replacing it with a modulation flag for the TL texel. Such an arrangement is conceptually simpler, but is more expensive to detect the 'constant case'.

Figure 11:
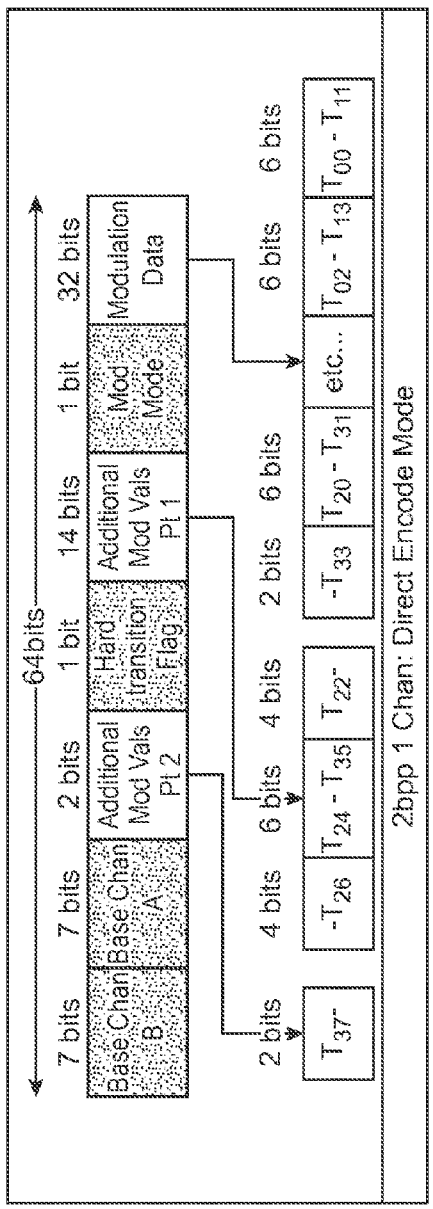
FIG. 11 shows how these bits are derived from the stored modulation data and additional modulation values in an alternative compressed data format.

FIG. 11 shows the storage of the 6-bit groups through the modulation data, the additional modulation values (14-bits) and the additional mod val part 2 (2-bits) this is one option for the storage order of the data but other options are available without departing from the scope of the proposal.

Interpolated Modulation Mode

Figure 12:
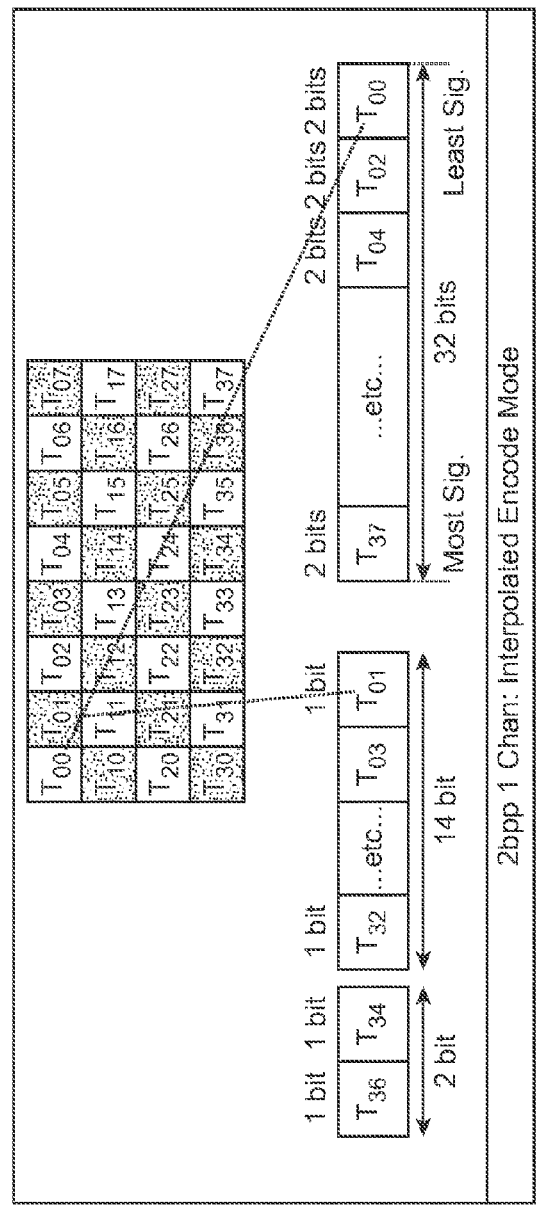
FIG. 12 shows an interpolated modulation mode where modulation bits are applied to alternative texels.

This interpolated modulation mode attempts to improve on the above described 2-bit per pixel scheme, in which (nearly) every alternate texel in the region uses a 2-bit modulation value. In FIG. 12 the texels shown in white each use one of four explicitly defined modulation values of 0, 3/8, 5/8, or 8/8, and the modulation values of the grey texels are implied, or derived from those of the white texels.

In WO2009/056815, all of the grey texels in the region would be interpolated from the white ones in the same way, either horizontally, vertically, or from all four white neighbours.

In this embodiment, the 32-bits are applied in alternate pairs as modulation values to the white texels and, for example, can apply the 4-level modulation values to those texels. As in the direct encoded modulation mode, 16 additional modulation bits are available. The additional 16-bits are then applied to each of the grey texels, the alternate texels in the chequer-board pattern of FIG. 12, and are used to select whether the grey texels' modulation values are derived by interpolating their horizontal neighbours or vertical neighbours. This is shown in table 7. In an alternative embodiment, the flags could imply that the 'grey' texels are produced by interpolating the final decoded texel results of the neighbours, rather than the modulation values.

TABLE 7

Figure 1:
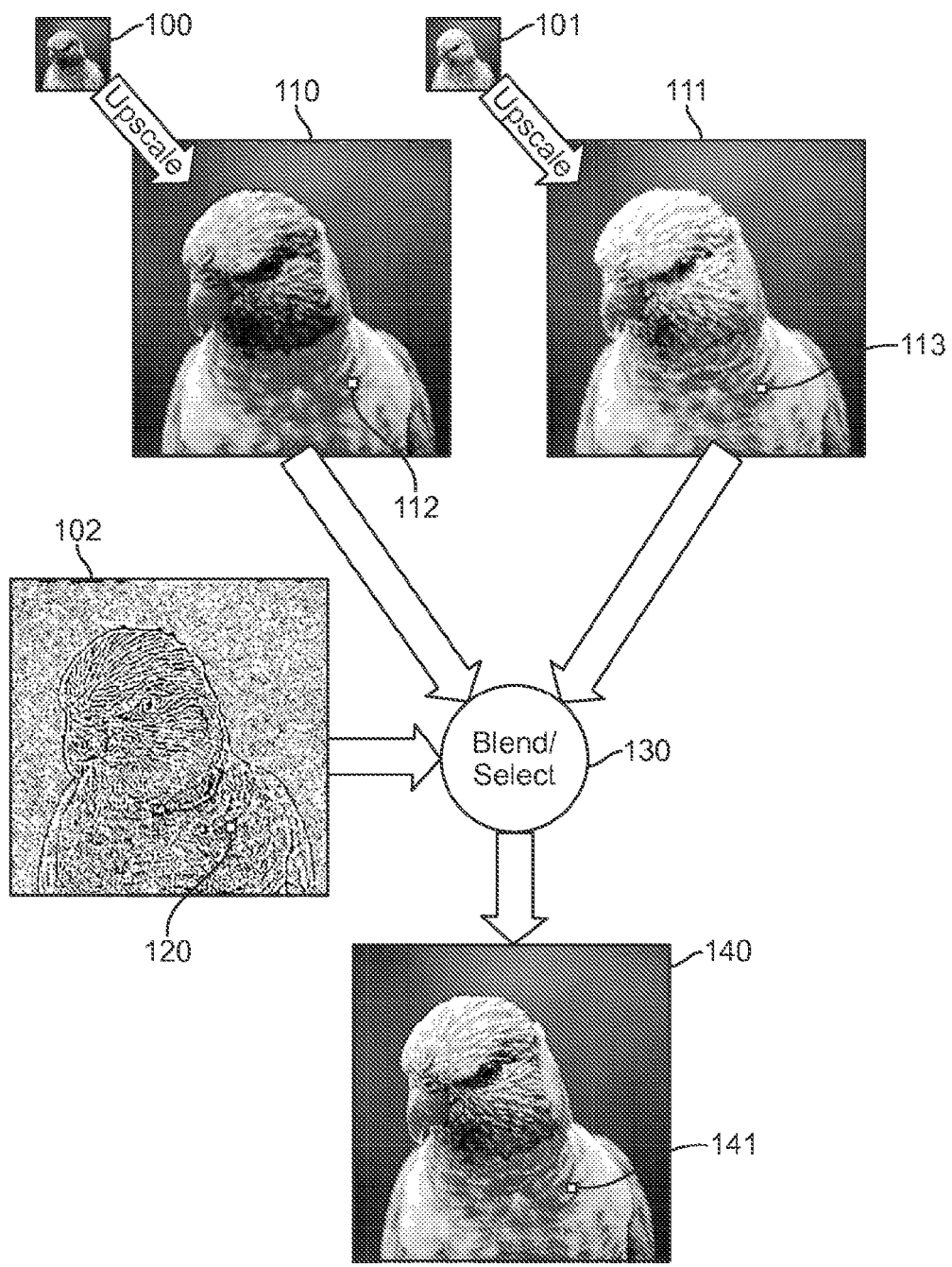
FIG. 1 shows an overview of the decompression process applied to images in GB2417384.
Figure 2:
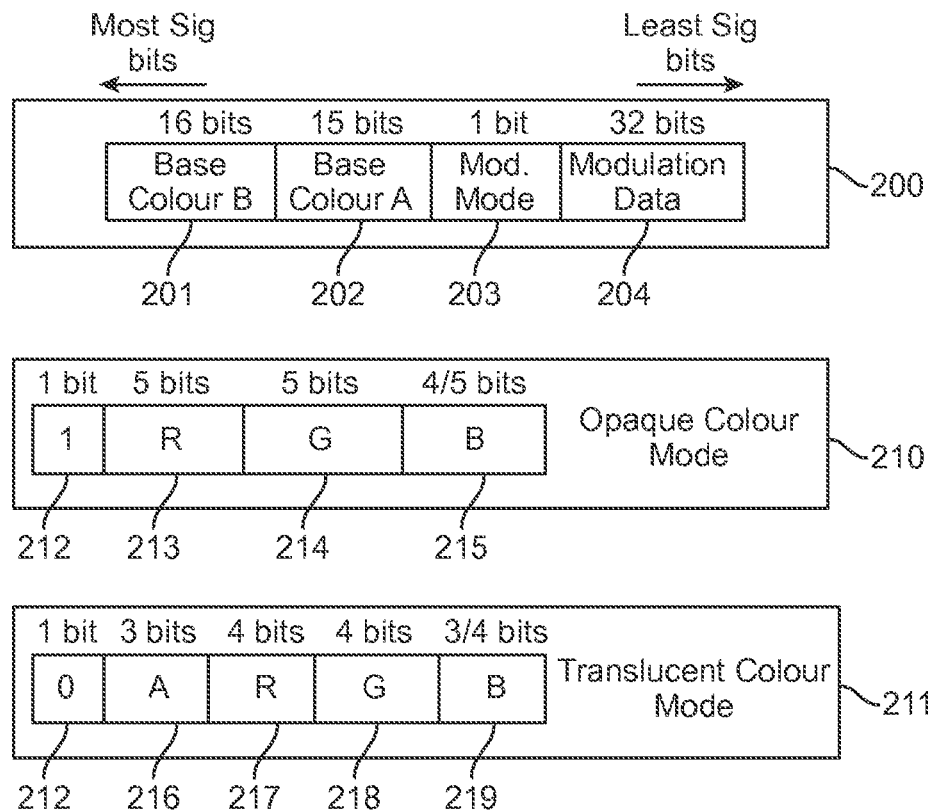
FIG. 2 illustrates the format of colour data in GB2417384 when packed into 64-bit units.
Figure 3:
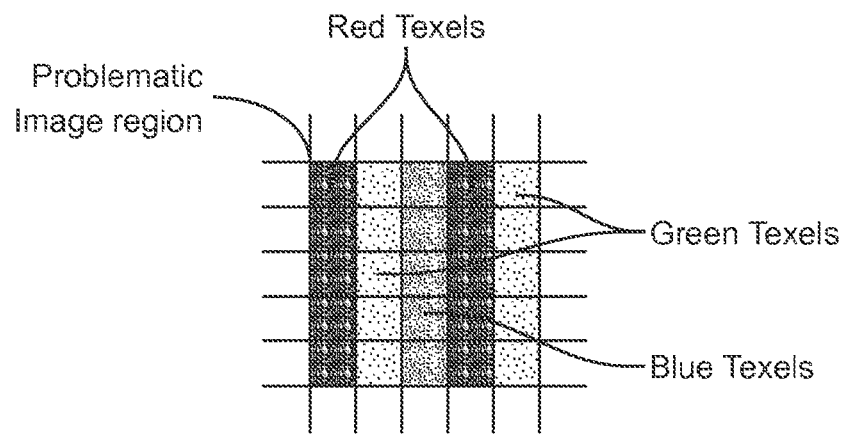
FIG. 3 shows an example of a problematic image for texture compression systems including that of GB2417384.
Figure 4:
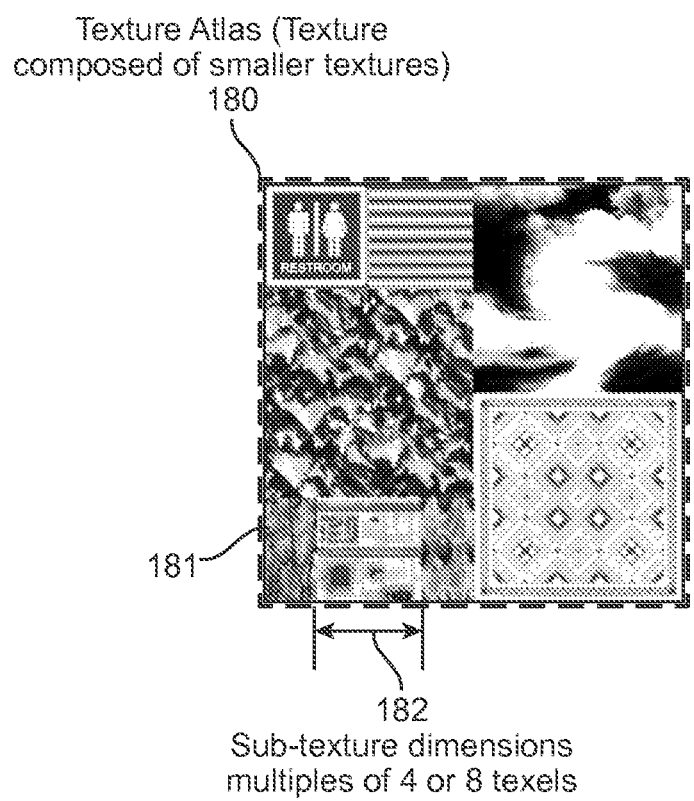
FIG. 4 is an example of a texture atlas.

FIG. 1: 2 bpp 1 Chan—Interpolated Modulation choices

| Bit Value | Interpolation Method |
| --- | --- |
| 0 | Use Horizontal Neighbours |
| 1 | Use Vertical Neighbours |

Dual Channel Format

This dual channel format is illustrated with reference to FIG. 13. As can be seen, base A and base B each have two portions R0 and R1. Base A has 3 bits for each of these and base B has 4 bits for each. Usually such an arrangement will not be full colour. In all other aspects, this behaves in the same manner as the 1.5 channel format.

Three Channel Format

The inventors have appreciated that, while the full colour encodings presented in the GB2417384 and WO2009/056815 are flexible, they are frequently inefficient, in that the 6 channels of data in the two pairs of RGB channels (i.e. the A and B colours in each 64-bit data word) are often very strongly correlated. Using a more sophisticated compression technique, it will be possible to provide the full colour encoding in 14 bits. Also, this can be used for three channels where full colour is not required but three channel data is beneficial. Furthermore, in another embodiment, the encoding methods of the 1.5 and 2 channel modes could be considered a subset of the 3-colour mode.

One Bit Per Pixel Format (1BPP)

There is now described what we refer to as the 1BPP format which is intended to support 1, 2 and 3 channel options, including 1.5 channel, 2 channel or RGB.

Figure 13:
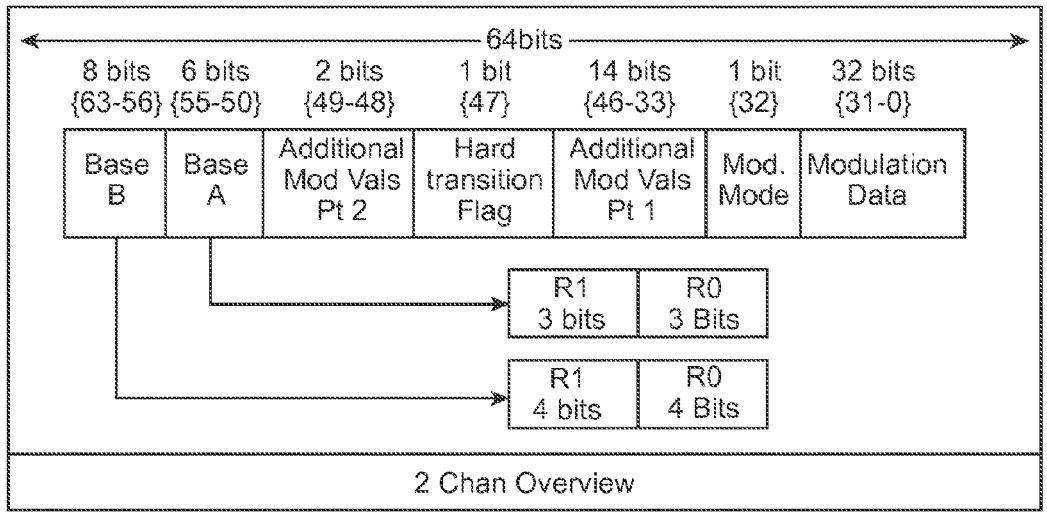
FIG. 13 shows how the colours base A and base B are separated into two channels in a dual channel format embodying the invention.

The data structure used is the same as in FIGS. 11 and 13, i.e. there are 14 bits for the channel data, 32 bits for modulation data, an additional 14 bits for modulation data part 1 and an additional 2 bits for modulation data part 2 and, the 1 bit modulation mode flag and the 1 bit hard transition flag.

As can be seen, there are a total of 48 bits of modulation data. These are designated as 6 bits to an X code, 6 bits to a Y code and 6 bits to a Z code. There are then 30 bits remaining which are arranged in 15 pairs (V 0, 1 . . . V 3, 3).

Figure 15:
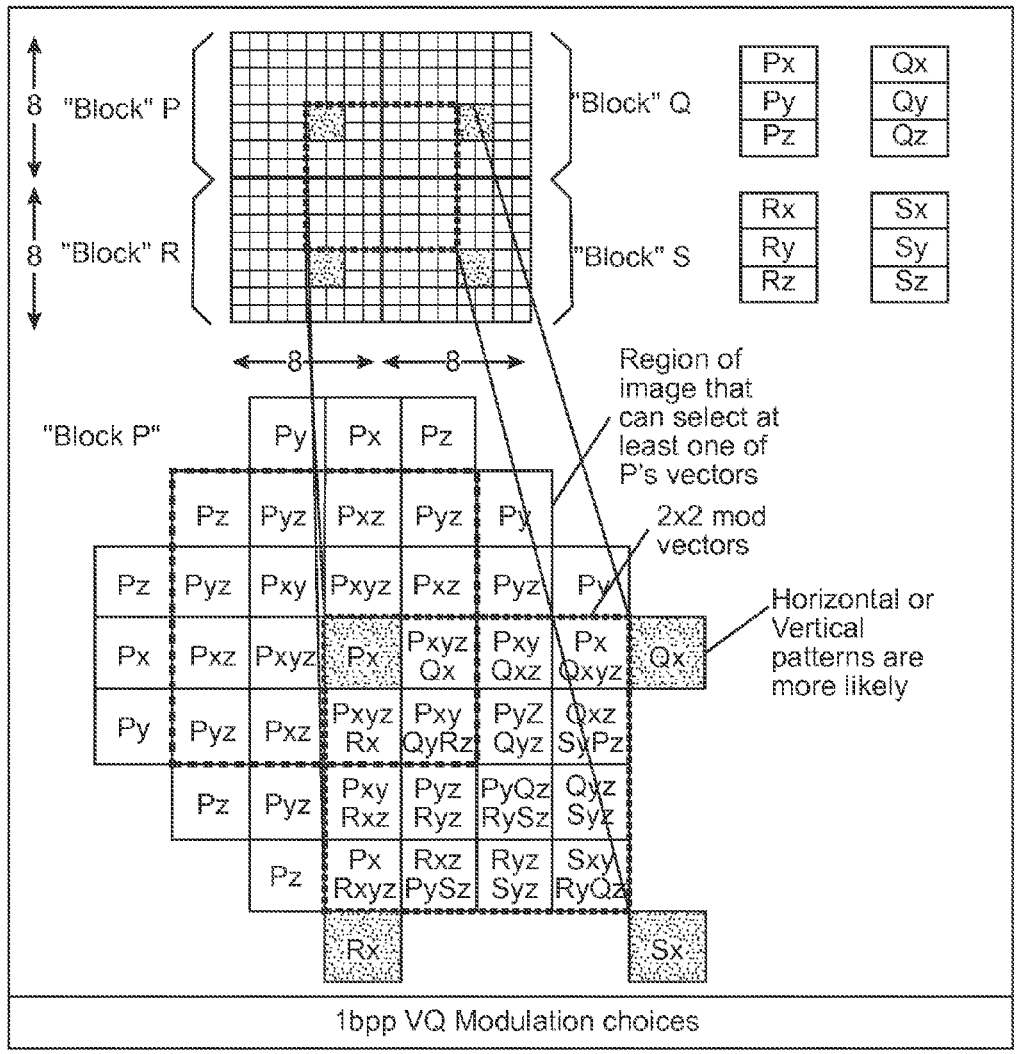
FIG. 15 shows schematically how indexing values for sets of four pixel can be selected to index into specific per pixel modulation values in a 1 bit per pixel embodiment of the invention.

The upscaling of the A and B data from a set of 64-bit words is shown for an 8×8 subset of pixels in FIG. 15. Further, each 64-bit data word stores modulation data corresponding to 64 texels. FIG. 15 shows four 8×8 texel blocks named blocks P, Q, R, and S, which as before, have an associated set of 64-bit data words, Pw, thru Sw, The central quartiles can be decoded using just the data of Pw thru Sw, These are shown in the lower portion of FIG. 15 partitioned into 2×2 texel blocks, with the texel blocks to the left and above this central area also shown.

The central 8×8 texels are decoded from the four 64-bit words, each of which has respective X, Y and Z codes and these are also shown schematically in FIG. 15. Therefore Px, Py, and Pz each have 6 bits assigned to them, as Qx, Qy, Qr, Qz etc.

Four of the 2×2 blocks shown are shaded grey, one for each 8×8 pixel block. These are in a position below and to the right of the centre point of each respective block. Each of these grey 2×2 blocks is always assigned the respective X code from the 64 bit word from which it is decoded.

Therefore in block P, Px is assigned to this 2×2 block, in block Q, code QX is assigned, etcetera.

The use of the respective X value (vector) from each of blocks P, Q, R and S for one of the 2×2 blocks in each respective P, Q, R and S block (the grey blocks) leaves 30 modulation bits to be assigned to the remaining fifteen 2×2 blocks. These are used to index into a subset of four of the total 12, 6-bit index values (vectors) eg PX, PY, QY, RZ, determined to be selectable for each of the other 2×2 blocks. The use of 2 bits enables four different possible first index codes to be assigned to each 2×2 block. Each of these 4 different codes corresponds to one of the possible twelve 6 bit index codes (PX, PY, PZ etc) available to that block. Thus, it can be seen that a total of 18 bits are used for the first level index which assigns different values of modval X and modval Y to each pixel in each 2×2 block. The other 30 bits are used to index into different ones of the four possible 6 bits codes selectable for each 2×2 block (apart from the grey 2×2 block which is set with the X vector (or some other predetermined vector) for that 8×8 block, as its index value.

The remaining 15, 2×2 blocks each have a 2-bit index which is used to reference a particular subset of four of the 12 possible XYZ codes of blocks P thru S. FIG. 15 shows which subsets of 4 XYZ codes can be used by each of the 2×2 blocks.

The 6 bit code assigned to each of these 2×2 blocks is the first index level applied. The G-bit encoding used by the X,Y Z codes are expanded to 2×2 pixel blocks in exactly the same manner as the direct encoded modulation mode described above with respect to the 1.5 channel 2 bits per pixel mode of operation. This is to say, each 6-bits are comprised of a flip order flag, 2 bits for modulation value choice and three pixel mod bits which indicate which of two modulation values is assigned to each of the TR, BL and BR pixels. These access the X or Y values as per table 5 unless all three mod bits are zero, in which case all 2×2 pixels have the same modulation value and are decoded according to table 6

In more detail, consider each of the four 2×2 blocks in the bottom quartile of block P. As noted earlier, the 2×2 marked "Px" is always decoded using the 6-bit code, Px. The 2×2 block immediately to its right—marked "PxyzQx"—may select one of the set Px, Py, Pz or Qx. Similarly, the 2×2 block immediately below "Px", i.e. marked "Pxyz Rx" may select one of Px, Py, Pz or Rx. The 2×2 diagonally to the right and below may select one encoding from the set Px, Py, Qy or Rz.

As can be seen from the expanded block of FIG. 15, the lower left quartile of block Q has 2×2 blocks which are each able to select from four 6 bit first level index codes from block Q and from adjacent blocks P and S, with various combinations being available for each 2×2 block. The top left quartile of block S is able to select for each 2×2 block a 6 bit first level index value selected from a set of 4 for each 2×2 block, this is being derived from block S, block P, block Q and block R. For the top right quartile of block R, each 2×2 block can select one of four 6 bit first index values selected from block R, block P and block S for each 2×2 block. Thus for each quartile, first index values from immediately adjacent blocks are used, thus reducing the number of blocks (P, Q, R, S which need to be accessed to decompress a texture and preferably limiting this to a maximum of four. Using such a scheme evenly distributes the index codes across the region for selection and copes efficiently with horizontal and vertical edges in the modulated image. Furthermore, assignment of XYZ subsets codes in the above embodiment has been done to minimise the number of 64-bit data words required to decode any set of adjacent 2×2.

The modulation mode bit and the hard transition flag bit can be used for an additional level of modulation selection. Alternatively the hard transition flag can be used to select a hard transition mode as described in WO2009/056815, and the modulation mode can be used for modulation selection. For example, they could be used to indicate a different mapping for neighbouring index code vectors, they could indicate that after decoding the modulation values should be low pass filtered with their neighbours, or they could indicate that any two vectors are stored locally and that the additional six bits of first level indexing are used for (eg more colour precision). Alternatively, the modulation mode and hard transition flag bits could be assigned as further modulation bits, extending the number of 2×2 modulation index values from 15 to 16, and allowing one of four vectors to be selected for the grey shaded 2×2 blocks in FIG. 15.

Figure 14:
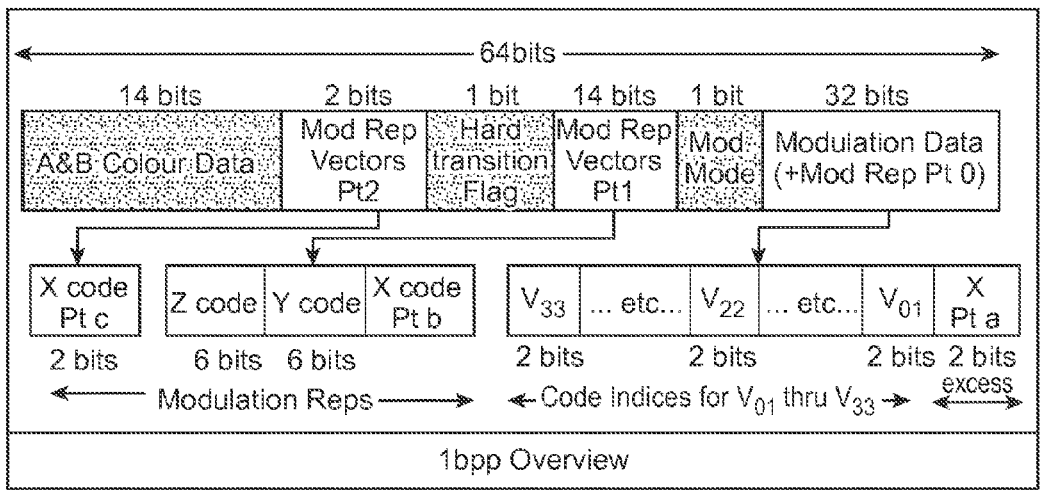
FIG. 14 shows the structure distribution of modulation data in a compressed texture format for use in a 1 bit per pixel embodiment of the invention.

The arrangement shown in FIG. 14 has 14 bits for A and B data. In the case of 1.5 and 2 channel formats which are not full RGB, this is straight forwardly encoded. For an RGB system, the A and B pair must be encoded with 14-bits and thus must use a scheme that exploits the likely correlation between the various colour channels.

Thus the 1 bpp scheme operates by using 2 levels of indexing into modulation values between images A and B. A first index level indexes into modulation values for each texel in a 2×2 block with a 6 bit index being used per 2×2 block. A second index level then selects between four possible first index level values for each 2×2 block, with the four possible first index levels coming from at least the current 8×8 block and optionally from adjacent blocks. The scheme may be modified to operate with different sized blocks.

Compression Schemes

All the above schemes can be used to compress texture data and general image data as required. Compression is not required to happen in real time in the cases of e.g. textures which will be created for specific software application and will be downloaded to a users device with that software application. Compression is an iterative process dependent on a trade off between a number of factors and those skilled in the art will be able to compress textures in any of the above formats using their common general knowledge.

Decompression Techniques

Figure 16:
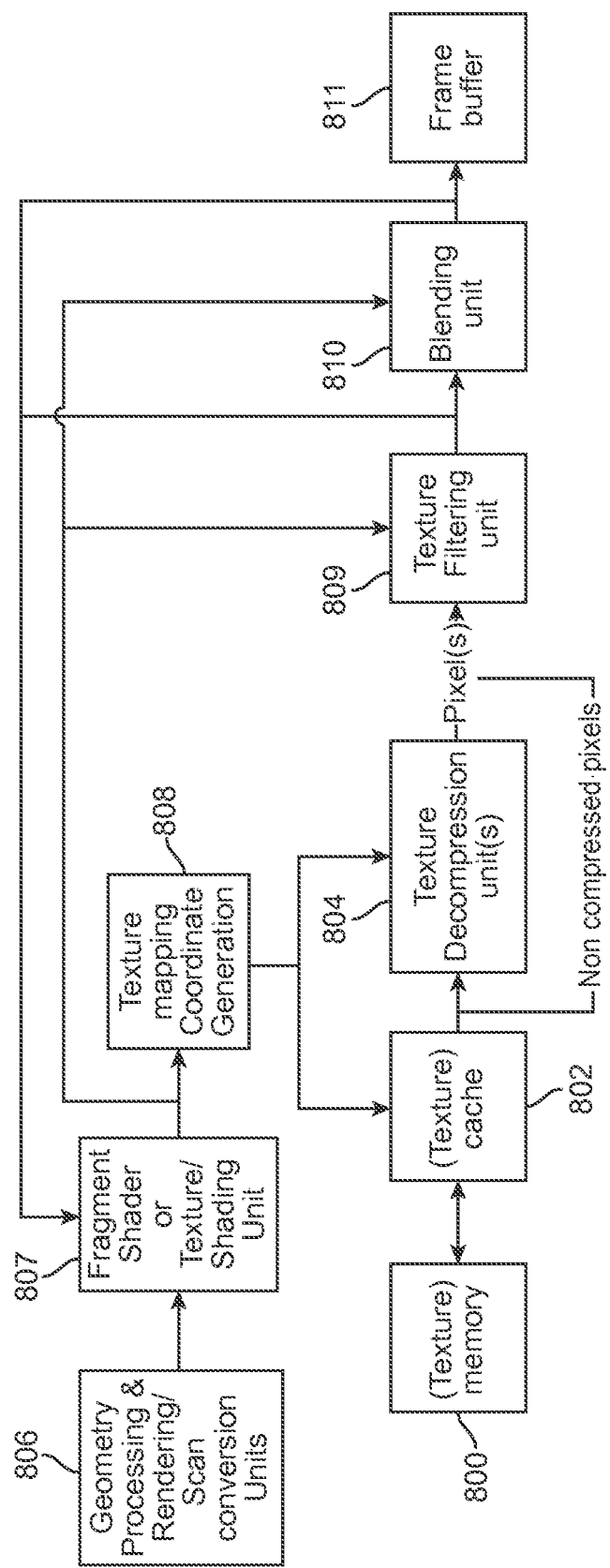
FIG. 16 is a block diagram of a system in which the invention may be used.

Decompression needs to take place at a user's device when a software application is run which provides compressed texture data which will be mapped to an appropriate part of a display. A block diagram is shown in FIG. 16. This comprises a texture memory 800 which stores one or more compressed textures, a texture cache 802 which can store a plurality of compressed texture words and preferably at least four. This can provide compressed texture data to a texture decompression unit 804. Note that the texture memory may be dedicated to storing texture data or could be shared with other data such as in a unified store. Similarly, the texture cache may be dedicated or a general purpose cache. Further, the cache could be optional if the memory 800 is sufficiently fast.

A geometry processing and rendering unit 806 generates the image data to which texture information is to be applied. This supplies output data concerning the image to a programmable fragment shading unit or, alternatively, a fixed function texture and shading unit 807. This in turn supplies data to a texture mapping coordinate generation unit 808 which provides texel coordinates to the texture decompression unit, the coordinates correspond to texels or areas of texels which are to be decompressed and filtered, and instructs the cache to supply the relevant compressed texture words required to decompress those texels The fragment shader or texture/shading unit also supplies data to the texture filtering unit 809 which may return data to 807 or supply that to a blending unit 810 which can combine the decompressed and filtered texture with the previously produced results. The output may be returned to the 807 unit or output to a frame buffer 811.

In an embodiment, the decompression unit would decompress at least 2×2 texels in parallel, i.e. the number required to perform bilinear texture filtering in 809. Higher order filters, such as trilinear or anisotropic might then require multiple decode cycles. In other embodiments, additional or more powerful decompression facilities could be included to supply the additional texel data in parallel for such filters.

1 Bit Per Pixel Decompression

Figure 17:
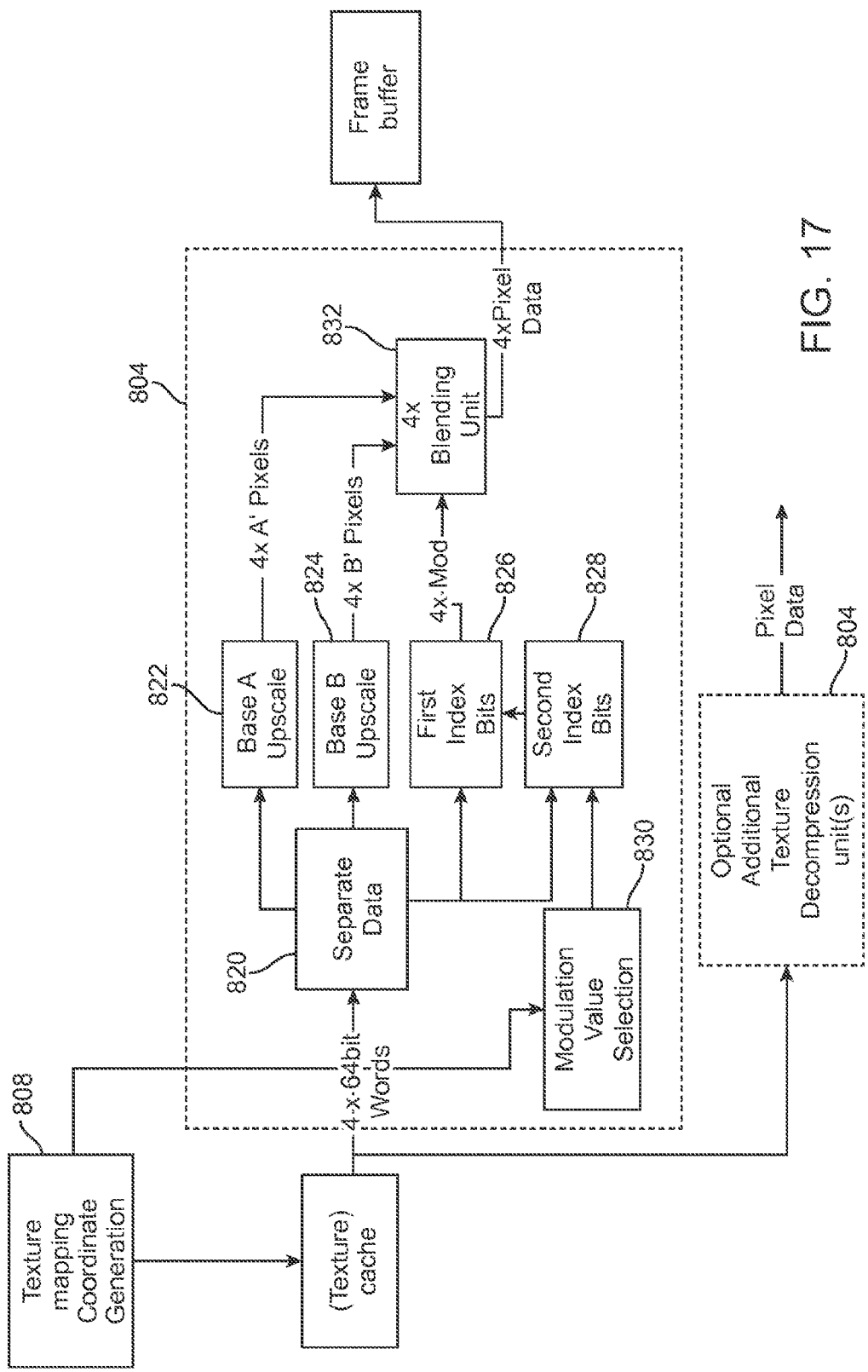
FIG. 17 is a block diagram of a decompressor for use in one embodiment of the inventions.

FIG. 17 shows an expanded version of the texture decompression unit 804 of FIG. 16 and is for a 1 bpp scheme, that is to decompress image data compressed in the manner described in relation to FIG. 15. In the embodiment of FIG. 17, one such decompression unit 804 is shown in expanded form with internal blocks. In this embodiment the decompression unit provides four decompressed texels—arranged in a 2×2 group—in parallel. The embodiment also shows optional additional decompression units.

The texture cache 802 supplies four compressed data words (4×64 bits) to a separate data unit 820. This separates the received texture data into the various component parts for each texture decompression unit. Thus, for the expanded texture decompression unit shown, four sets of 14 bits of A and B colour data are upscaled and expanded into base A and base B colours at 822 and 824. Four sets of first index bits (X code, Y code, Z code) are extracted to unit 826 and the required portions of second index bits from the remaining 4×30 bits of modulation data are extracted to a second index bits unit 828. Note that in a preferred embodiment, not all of the modulation data will be required—only the portions corresponding to the central region of FIG. 16 will need to be supplied to 828 within the decoder for any given decode. Note that the other portions can be accessed when for a different target set of decoded texels.

As discussed above, the second index bits for a block of 2×2 pixels are used to determine which X, Y or Z code from the current block and/or an adjacent block are required to index into modulation values for each of the pixels in that 2×2 block. The texture mapping coordinate generation unit 808 indicates, to the modulation value selection unit, 830, which 2×2 texels in the local region are required. Unit 830 then determines which set of the second index bits are needed to decode those 2×2 set of texels and those in turn, determine which of the first index bits are also needed to derive the per-texel modulation values. The decoded modulation values for the 2×2 block are used to blend the corresponding upscaled A' and B' colours in unit 832 to produce 4 decoded texels which will then be used by the filtering unit of FIG. 16.

4 Bits Per Pixel Decompression.

Figure 18:
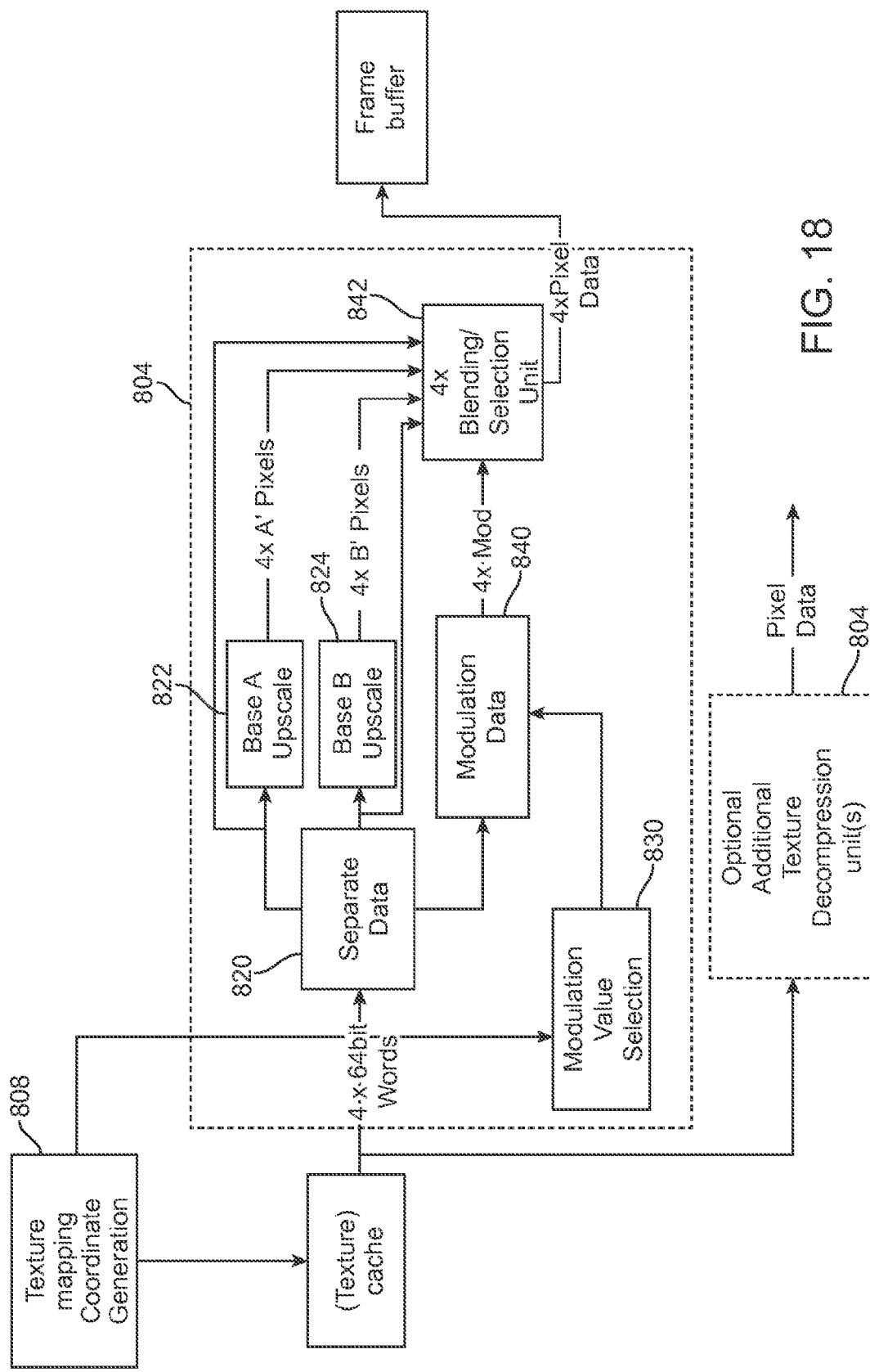
FIG. 18 is a block diagram of decompression unit. Specifically for use in the 4 bits per pixel embodiment.

The embodiment of FIG. 18 has blocks similar to FIG. 17 in the texture cache 802, the separate data 820, the base A and base B colour upscale units 822 and 824, the modulation value selection unit 830, an enhanced blending/selection unit 842 and the texture mapping and coordinate generation unit 808.

However, the separate data unit 820 is somewhat different due to the different modulation data. The potential subset of required modulation values are supplied to unit 840 and then the further, smaller 2×2 subset of the modulation values are decoded and extracted and delivered to the blending/selection unit 842. The latter has expanded functionality relative to that of 832 in that it supports additional modes such as set out, for example, in Table 1 above.

2 Bits Per Pixel Decompression Unit.

Figure 19:
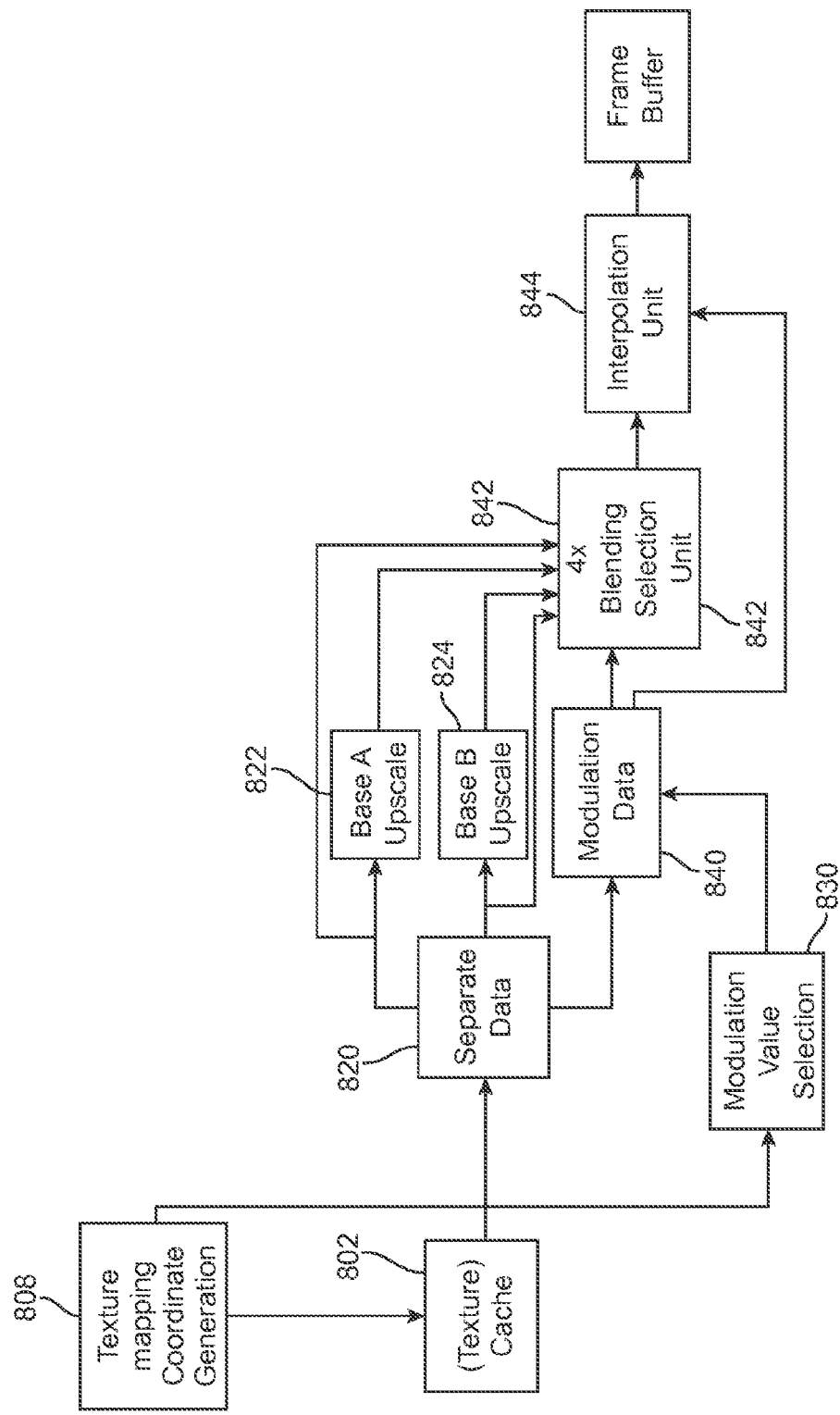
FIG. 19 is a block diagram of a decompression unit for use in the 2 bits per pixel direct encoded and interpolated modulation mode.

A 2 bits per pixel decompression unit is shown at FIG. 19. This is similar to FIG. 18. The difference between this and FIG. 18 is that the modulation decoding interprets via units 830 and 840 the direct encoding formats as set out for examples in tables 5 and 6 and FIG. 10, and also the interpolated encoding given for example by FIG. 12 and table 7.

An optional interpolation unit 844 is controlled by modulation bits from table 7 to selectively interpolate image data as required. If the system is not intended to perform interpolation then this may be omitted.

Finally, preferred modes of operation are summarised below:

Mode 1 A method for compressing blocks of electronic image data comprising the steps of:
  a) generating at least two sets of reduced size image data from the image data, each element of each set of reduced size being representative of a plurality of elements of the image data;
  b) generating a modulation value for each elementary area of the image from the image data, the modulation value encoding information about how to combine the sets of reduced size image data to generate an approximation to the image;
  c) generating a set of first index values, from a plurality of first index values each first index value corresponding to a set of possible modulation values for each of the respective elementary areas of a first group of elementary areas;
  d) assigning a first index value from the set of first index values to each respective first group of elementary areas;
  e) generating a set of second index values, each second index value corresponding to one of the set of first index for each first group of elementary areas;
  f) assigning a second index value to each first group of elementary areas corresponding to the first index value assigned to that group of elementary areas;
  g) for a plurality of first groups of elementary areas, storing the at least two sets of reduced size image data, the first set of index values assigned to each of said plurality of first groups of elementary areas, and the respective second index value assigned to each of said plurality of first group of elementary areas.

Mode 2 A method according to mode 1 in which the first set of index values includes first index values from a least one adjacent block of electronic image data.

Mode 3 A method according to mode 1 or 2 in which the storing step stores a plurality of 64 bit compressed data words, including 48 bits of index data per word, and each 64 bit word represents an 8×8 block of elementary areas.

Mode 4 A method according to mode 3 in which each group of elementary areas comprises a 2×2 block of elementary areas and each second index value comprises 2 bits for selecting a first index value for a 2×2 block.

Mode 5 A method according to mode 4 in which the second index value can select from four possible first index values for each group of elementary areas, at least one of the first index values being derived from a 64 bit compressed data word stored for an adjacent 8×8 block.

Mode 6 A method for decompressing compressed electronic image data, the compressed data comprising at least two sets of reduced size data for each of a plurality of blocks of image data and first and second index values for retrieving modulation data for each elementary area of each of the plurality of blocks, the second index values being assigned to respective first index values the first index values comprising first index values stored with a current block and at least one first index value from at least one adjacent block, the method including the steps of:
  accessing compressed image data from at least two adjacent blocks;
  retrieving respective modulation data for each elementary area of the at least two adjacent blocks using the second index values to retrieve respective first index values and the first index values to retrieve respective modulation data for each elementary area of a group of elementary areas to which each respective first index value is assigned; and
  combining the two sets of image data using respective retrieved modulation data for each elementary area.

Mode 7 A method for compressing blocks of electronic image data comprising the steps of:
  a) generating at least two sets of reduced size image data from the image data, each element of each set of reduced size being representative of a plurality of elements of the image data;
  b) generating a modulation value for each elementary area of the image from the image data, the modulation value encoding information about how to combine the sets of reduced size image data to generate an approximation to the image;
  c) generating a set of 6 bit index values, from a plurality of 6 bit index values each 6 bit index value corresponding to a set of possible modulation values for each of the respective elementary areas of a group of 4 elementary areas;
  d) assigning a first index value from the set of 6 bit index values to each respective group of 4 elementary areas;
  e) generating a set of 2 bit index values for each group of 4 elementary areas, each 2 bit index value indexing one of the set of 6 bit first index for each first group of 4 elementary areas;
  f) assigning a 2 bit index value to each group of 4 elementary areas corresponding to the 6 bit index value assigned to that group of 4 elementary areas;
  g) for a plurality of groups of 4 elementary areas, storing the at least two sets of reduced size image data, the 6 bit index values assigned to each of said plurality of groups of 4 elementary areas, and the respective 2 bit index value assigned to each of said plurality of groups of 4 elementary areas.

Mode 8 Apparatus for decompressing compressed electronic image data, the compressed data comprising at least two sets of reduced size data for each of a plurality of blocks of image data and first and second index values for retrieving modulation for each elementary area of each of the plurality of blocks, the second index value has been assigned to respective first index values, the first index values comprising first index value stored with a current block, the apparatus comprising:
  a cache for receiving compressed image data;
  a first indexing unit for retrieving modulation data for each elementary area of a group elementary areas to which the first index value is assigned;
  a second indexing unit indexing respective first index values to each group of elementary areas; and
  a blending unit for combining the two sets of image data using retrieved modulation data for each elementary area.

Mode 9 Apparatus according to mode 8 in which the first index values comprise first index values stored with a current block and at least one first index value from at least one adjacent block.

Mode 10 Apparatus according to mode 8 or 9 in which the compressed image data comprises a plurality of 64 bit compressed data words, including 48 bits of modulation data per word, and each data word represents an 8×8 block of elementary areas.

Mode 11 Apparatus according to mode 10 in which each group of elementary area comprises a block of 2×2 elementary areas, and each second index value comprises 2 bits of data for selecting a first index value for a 2×2 block.

Mode 12 A method for compressing block of electronic data for 4×4 blocks of elementary areas comprising the steps of:
  a) generating at least two sets of reduced size image data from the image data, each element of each set of reduced size being representative of a plurality of elements of the image data, the two sets comprising 14 bits of data;
  b) selecting a modulation mode with a further 2 bits of data, each modulation mode including a plurality of modulation values;
  c) selecting a modulation value for each elementary area of the image from the plurality of modulation values for the selected modulation mode, the modulation value encoding information about how to combine the sets of reduced size image data to generate an approximation to the image;
  d) indexing the modulation value selected for each elementary area with 3 bits of index data per elementary area;
  e) storing the image data, the 2 further bits of data, and the 3 bits of index data per elementary area for each 4×4 block.

Mode 13 A method for compressing blocks of electronic image data for 8×4 blocks of elementary areas comprising the steps of:
  a) generating at least two sets of reduced size image data from the image data, each element of each set of reduced size being representative of a plurality of elements of the image data, the two sets of comprising 14 bits of data;
  b) for each 2×2 block of elementary areas assigning a modulation value from a set of possible modulation values to each elementary area;
  c) indexing the modulation values assigned for a group of 2×2 elementary areas with 6 bits of modulation data;
  d) storing the image data, and the 3 bits of modulation for each 2×2 group of elementary areas in the 8×4 block of elementary areas.

Mode 14 A method for compressing blocks of electronic image data for 8×4 blocks of elementary areas comprising the steps of:
  a) generating at least two sets of reduced size image data from the electronic image data, each element of each set of reduced size being representative of a plurality of elements of the image data;
b) selecting a modulation value from a plurality of modulation values for alternate ones of the elementary areas in the 8×4 block;
c) indexing the modulation values selecting for each alternate elementary area with 2 bits of index data per elementary area;
d) assigning a single bit to each other alternate elementary area, the single bit indicating whether modulation data for that other elementary area should be interpolated from adjacent horizontal elementary areas or from adjacent vertical elementary areas.

Mode 15 A method for decompressing compressed electronic image data for 4×4 blocks of elementary areas comprising the steps of:
receiving at least two sets of reduced size image data;
receiving 2 bits of data defining a modulation mode;
receiving 3 bits of index data for each elementary area;
retrieving a modulation value for each elementary area using the index value for that elementary area to index into a plurality of modulation values; and
combining the at least two sets of reduced size image data using the retrieved modulation value for an elementary area to derive decompressed image data for that elementary area.

Mode 16 A method for decompressing blocks of electronic image data for 8×4 blocks of elementary areas comprising the steps of:
receiving at least two sets of reduced size image data, each element of each set being representative of a plurality of elements of the image data, the two sets comprising 14 bits of data;
receiving 6 bits of index data for each group of 2×2 elementary areas in the 8×4 block;
using the index data for each group of 2×2 elementary ares to retrieve modulation values for each elementary area in that group of 2×2 elementary areas; and
combining the at least two sets of reduced size image data to produce decompressed image data for each elementary area using its respective modulation value.

Mode 17 A method for decompressing electronic image data for 8×4 blocks of elementary areas comprising the steps of:
receiving at least two sets of reduced size image data, each element of each set of reduced size being representative of a plurality of elements of the image data;
receiving index data for each alternate elementary area in the 8×4 block, the index data comprising 2 bits of index data per alternate elementary area;
receiving a single bit for each other alternate elementary area in the 8×4 block;
retrieving a modulation value for each alternate elementary area using the said index value for each alternate elementary area to retrieve a modulation value from each said alternate elementary areas;
for each other alternate elementary area interpolating a modulation value for adjacent horizontal elementary areas when said bit assigned to each said other alternate elementary area has a first value and interpolating a modulation from adjacent vertical elementary areas when said bit assigned to each said other alternate elementary area has a second value; and
blending the at least two sets of image data for each elementary area using the thus determined respective modulation value to produce decompressed image data for each elementary area.

The invention claimed is:

1. Apparatus for decompressing compressed image data to derive blocks of electronic image data, each block comprising a plurality of elements of the electronic image data, the apparatus comprising;
a cache for receiving at least two sets of reduced size image data, each element of the two sets of reduced size image data being representative of a plurality of elements of the electronic image data;
an upscaler for upscaling the at least two sets of reduced size image data;
a modulation data unit for receiving modulation data encoding modulation values for each of said plurality of elements of image data, wherein for each of the blocks a set of bits of the received modulation data is assigned for each of a plurality of groups of modulation values for elements of the image data in the block, wherein the set of bits of modulation data assigned to encode a group of modulation values comprises:
(i) a plurality of modulation indicators for a respective plurality of modulation values in the group, wherein the modulation indicator for a respective modulation value in the group indicates which of a set of one or more candidate modulation values is to be used to represent that modulation value in the group; and
(ii) a plurality of modulation value choice bits indicating the set of one or more candidate modulation values for the group;
wherein the modulation data unit is configured to use the respective set of bits of modulation data for each of the groups to determine the modulation values for that group of modulation values; and
a blending unit for combining the at least two upscaled sets of reduced size image data using the determined modulation values to derive blocks of decompressed electronic image data.

2. The apparatus of claim 1, wherein said modulation data unit comprises: (i) a first unit configured to receive a plurality of sets of bits of modulation data for the groups; and (ii) a second unit configured to receive index values indicating which of the sets of bits of modulation data is assigned to each of the groups.

3. The apparatus of claim 1, wherein said modulation data unit comprises:
(i) a first unit configured to receive a modulation data word for each of the blocks of elements of image data, each modulation data word comprising a plurality of sets of bits of modulation data; and
(ii) a second unit configured to receive index values, the modulation data unit further comprising:
a modulation value selection unit configured to determine, based on the position of particular elements for which modulation values of a particular group are encoded, a plurality of available sets of bits of modulation data for the particular group as a subset of the sets of bits of modulation data stored in the modulation data word stored for the block of elements including the particular elements and in modulation data words stored for neighbouring blocks of elements; and
an index bits unit configured to use the received index values to select one of the available sets of bits of modulation data for the particular group as being assigned to the particular group.

4. A method for compressing electronic image data comprising two sets of elements which are arranged in an alternating pattern, the method comprising the steps of:
  generating at least two sets of reduced size image data from the electronic image data, each element of each set of reduced size image data being representative of a plurality of elements of the electronic image data, wherein the sets of reduced size image data can be combined using modulation values to provide a representation of the electronic image data;
  for each of the elements of a first of the two sets of elements of the electronic image data, assigning a modulation value selected from a plurality of modulation values; and
  assigning a respective flag corresponding to each of the elements of a second of the two sets of elements of the electronic image data, wherein the flag assigned for an element of the second set indicates whether a modulation value for that element is to be derived by interpolating modulation values assigned to adjacent horizontal elements or adjacent vertical elements.

5. The method of claim 4 wherein said assigning a modulation value for each of the elements of the first of the two sets of elements comprises assigning one of a set of predetermined modulation values for each of the elements of the first of the two sets of elements.

6. The method of claim 5 wherein each of the modulation values assigned for each of the elements of the first of the two sets of elements comprises 2 bits to indicate one of a set of four predetermined modulation values, said four predetermined modulation values being 0, 3/8, 5/8 and 8/8.

7. The method of claim 4 wherein each flag assigned for each of the elements of the second of the two sets of elements comprises 1 bit.

8. The method of claim 4 further comprising storing the sets of reduced size image data, indications of the modulation values assigned for each of the elements of the first of the two sets of elements, and the flags assigned for each of the elements of a second of the two sets of elements.

9. A method for decompressing compressed image data to produce electronic image data comprising two sets of elements which are arranged in an alternating pattern, the method comprising the steps of:
  receiving at least two sets of reduced size image data, each element of each set of reduced size image data being representative of a plurality of elements of the electronic image data;
  upscaling the at least two sets of reduced size image data;
  receiving an indication of a modulation value for each of the elements of a first of the two sets of elements of the electronic image data;
  receiving a respective flag for each of the elements of a second of the two sets of elements of the electronic image data;
  using the received indications to determine modulation values of the elements of the first of the two sets of elements of the electronic image data;
  for each element of the second of the two sets of elements of the electronic image data, deriving a modulation value for the element by interpolating modulation values assigned to adjacent horizontal elements when said flag for the element has a first value, and deriving a modulation value for the element by interpolating modulation values assigned to adjacent vertical elements when said flag for the element has a second value; and
  blending the at least two upscaled sets of reduced size image data for each element using the thus determined respective modulation values to produce decompressed electronic image data for each element.

10. Apparatus for decompressing compressed image data to produce electronic image data comprising two sets of elements which are arranged in an alternating pattern, the apparatus comprising:
  a cache for receiving at least two sets of reduced size image data, each element of each set of reduced size image data being representative of a plurality of elements of the electronic image data;
  an upscaler for upscaling the at least two sets of reduced size image data;
  a modulation data unit for: (i) receiving an indication of a modulation value for each of the elements of a first of the two sets of elements of the electronic image data, (ii) using the received indications to determine modulation values of the elements of the first of the two sets of elements of the electronic image data, and (iii) receiving a respective flag for each of the elements of a second of the two sets of elements of the electronic image data;
  a blending unit for blending the at least two upscaled sets of reduced size image data for each element using the thus determined respective modulation values; and
  an interpolation unit for deriving a modulation value for each element of the second of the two sets of elements of the electronic image data by interpolating modulation values assigned to adjacent horizontal elements if said flag for the element has a first value, and by interpolating modulation values assigned to adjacent vertical elements if said flag for the element has a second value.

* * * * *